US008002853B2

(12) United States Patent
Curello et al.

(10) Patent No.: US 8,002,853 B2
(45) Date of Patent: Aug. 23, 2011

(54) HYDROGEN-GENERATING FUEL CELL CARTRIDGES

(75) Inventors: Andrew J. Curello, Hamden, CT (US); Alain Rosenzweig, Saint Maur des Fossés (FR); Anthony Sgroi, Jr., Wallingford, CT (US); Paul Spahr, New Haven, CT (US); Constance R. Stepan, Oxford, CT (US)

(73) Assignee: Societe Bic (FR)

( * ) Notice: Subject to any disclaimer, the term of this patent is extended or adjusted under 35 U.S.C. 154(b) by 203 days.

(21) Appl. No.: 11/327,580

(22) Filed: Jan. 6, 2006

(65) Prior Publication Data

US 2006/0174952 A1 Aug. 10, 2006

Related U.S. Application Data

(63) Continuation-in-part of application No. 10/629,006, filed on Jul. 29, 2003, and a continuation-in-part of application No. 11/067,167, filed on Feb. 25, 2005.

(60) Provisional application No. 60/689,538, filed on Jun. 13, 2005, provisional application No. 60/689,539, filed on Jun. 13, 2005.

(51) Int. Cl.
*B01J 7/00* (2006.01)
*C01B 3/36* (2006.01)
*C01B 6/00* (2006.01)
*C01B 3/02* (2006.01)
*C01B 3/08* (2006.01)

(52) U.S. Cl. ........ 48/61; 48/197 R; 423/644; 423/648.1; 423/657

(58) Field of Classification Search ........................ 48/61
See application file for complete search history.

(56) References Cited

U.S. PATENT DOCUMENTS

| | | | | |
|---|---|---|---|---|
| 3,747,773 | A * | 7/1973 | Jackson | 210/495 |
| 4,201,243 | A * | 5/1980 | Martin | 137/510 |
| 4,261,956 | A | 4/1981 | Adlhart | |
| 4,725,002 | A * | 2/1988 | Trachte | 239/102.2 |
| 5,364,977 | A | 11/1994 | Asai | |
| 5,702,491 | A * | 12/1997 | Long et al. | 48/197 R |
| 5,901,742 | A * | 5/1999 | Kleppner et al. | 137/508 |
| 5,945,231 | A | 8/1999 | Narayanan | |
| 5,992,008 | A | 11/1999 | Kindler | |
| 6,512,005 | B2 | 1/2003 | Bercovici | |
| 6,554,877 | B2 | 4/2003 | Finkelshtain | |
| 6,562,497 | B2 | 5/2003 | Finkelshtain | |
| 6,683,025 | B2 | 1/2004 | Amendola | |
| 6,746,496 | B1 * | 6/2004 | Kravitz et al. | 48/118.5 |
| 6,758,871 | B2 | 7/2004 | Finkelshtain | |
| 6,773,470 | B2 | 8/2004 | Finkelshtain | |
| 7,438,732 | B2 * | 10/2008 | Shurtleff et al. | 48/61 |
| 2002/0011152 | A1 * | 1/2002 | Oku et al. | 96/4 |

(Continued)

*Primary Examiner* — Alexa D Neckel
*Assistant Examiner* — Matthew J Merkling
(74) *Attorney, Agent, or Firm* — The H.T. Than Law Group

(57) ABSTRACT

The present application is directed to a gas-generating apparatus and various pressure regulators or pressure-regulating valves. Hydrogen is generated within the gas-generating apparatus and is transported to a fuel cell. The transportation of a first fuel component to a second fuel component to generate of hydrogen occurs automatically depending on the pressure of a reaction chamber within the gas-generating apparatus. The pressure regulators and flow orifices are provided to regulate the hydrogen pressure and to minimize the fluctuation in pressure of the hydrogen received by the fuel cell. Connecting valves to connect the gas-generating apparatus to the fuel cell are also provided.

34 Claims, 12 Drawing Sheets

U.S. PATENT DOCUMENTS

| | | |
|---|---|---|
| 2002/0076602 A1 | 6/2002 | Finkelshtain |
| 2002/0182459 A1* | 12/2002 | Hockaday et al. ............. 429/19 |
| 2003/0077493 A1 | 4/2003 | Colborn |
| 2003/0096150 A1 | 5/2003 | Rice |
| 2003/0235724 A1* | 12/2003 | Ord et al. ..................... 429/19 |
| 2005/0022883 A1 | 2/2005 | Adams |
| 2005/0036941 A1* | 2/2005 | Bae et al. ................... 423/658.2 |
| 2005/0074643 A1 | 4/2005 | Adams |
| 2005/0118468 A1 | 6/2005 | Adams |
| 2005/0158595 A1* | 7/2005 | Marsh et al. .................... 429/19 |
| 2005/0266281 A1 | 12/2005 | Adams |
| 2007/0020172 A1* | 1/2007 | Withers-Kirby et al. .. 423/648.1 |

* cited by examiner

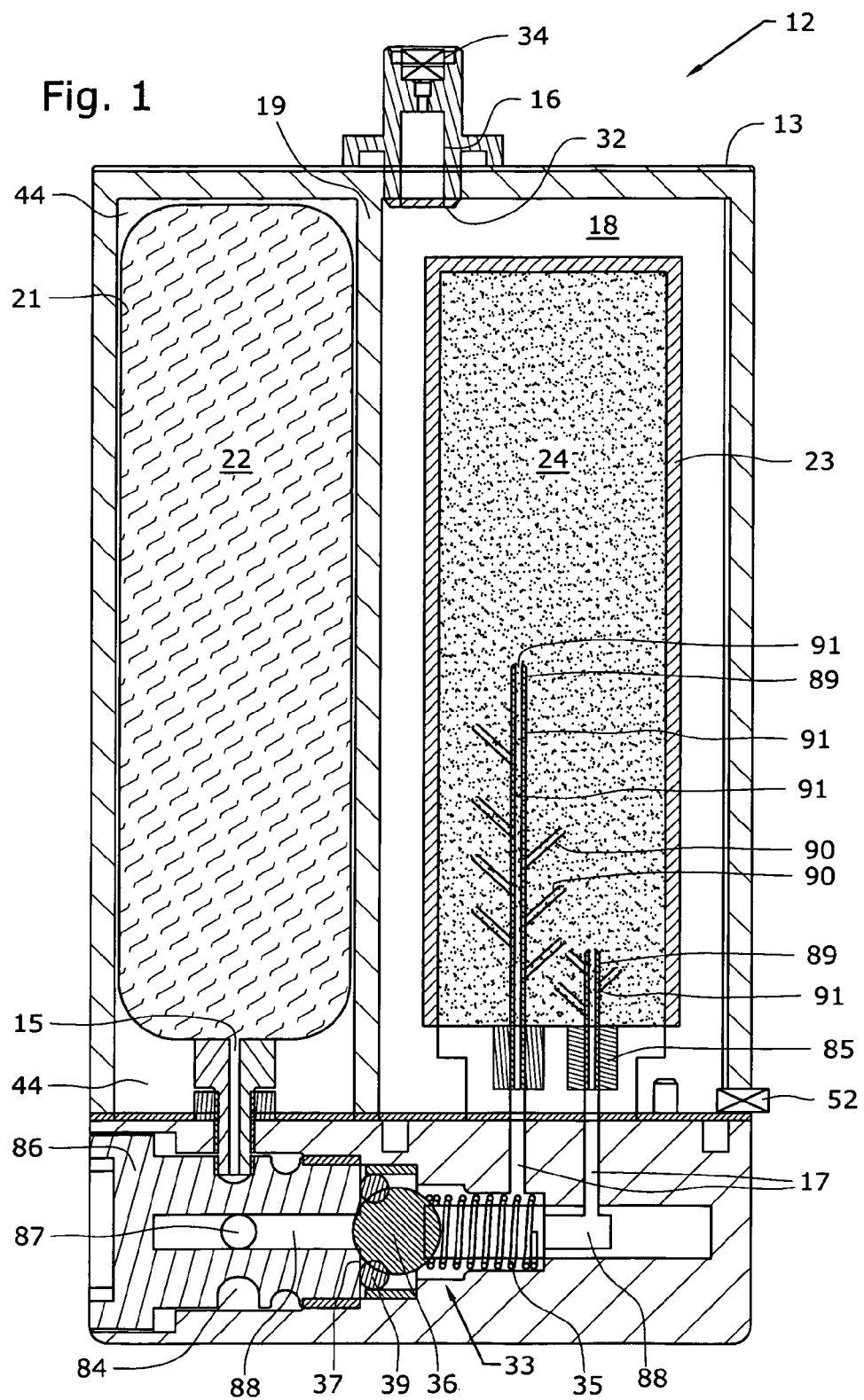

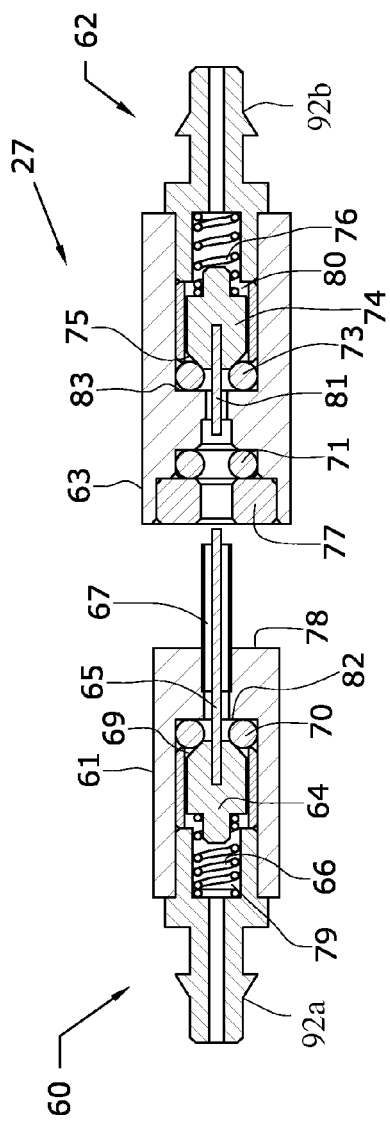
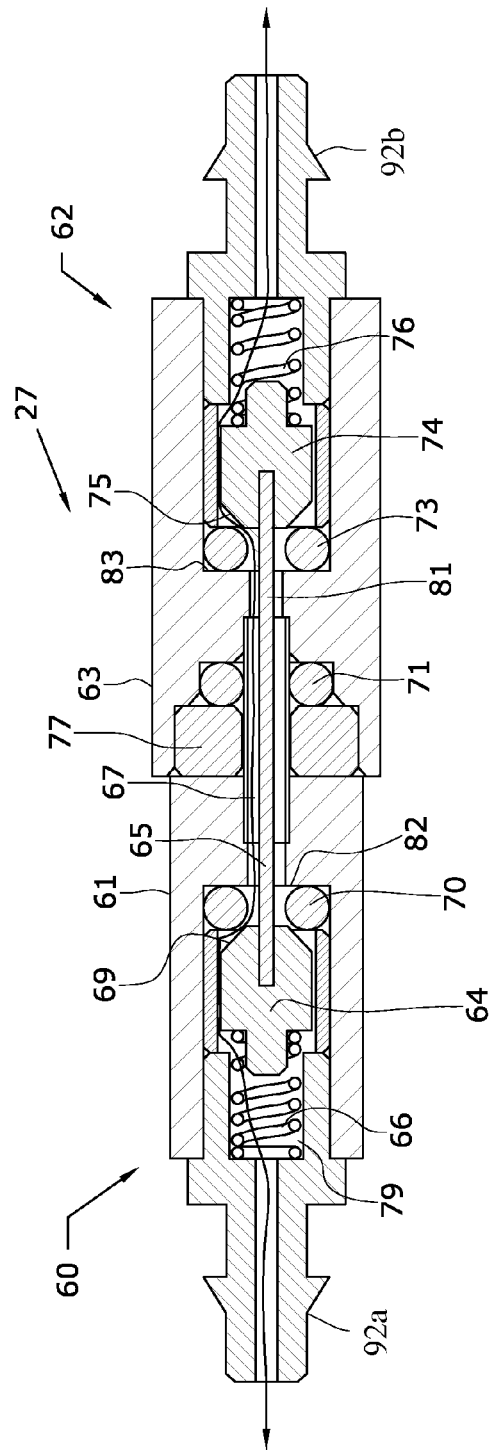
Fig. 2A
Fig. 2B

HYDROGEN-GENERATING FUEL CELL CARTRIDGES

CROSS-REFERENCE TO RELATED APPLICATIONS

This application is a continuation-in-part of U.S. application Ser. No. 10/629,006, filed Jul. 29, 2003, U.S. application Ser. No. 11/067,167, filed on Feb. 25, 2005, U.S. provisional App. No. 60/689,538 filed on Jun. 13, 2005, and U.S. provisional App. No. 60/689,539 filed on Jun. 13, 2005, all of which are incorporated herein in their entireties by reference.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel; (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, is the simplest and potentially smallest fuel cell and also has promising power application for consumer electronic devices. SOFC convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-reaction at the anode:

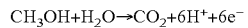

Half-reaction at the cathode:

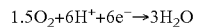

The overall fuel cell reaction:

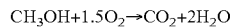

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated by reference herein in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

In another direct oxidation fuel cell, borohydride fuel cell (DBFC) reacts as follows:

Half-reaction at the anode:

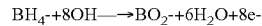

Half-reaction at the cathode:

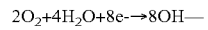

In a chemical metal hydride fuel cell, sodium borohydride is reformed and reacts as follows:

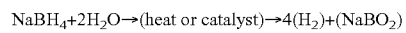

Half-reaction at the anode:

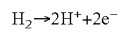

Half-reaction at the cathode:

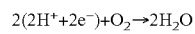

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water by-product. Sodium borate ($NaBO_2$) by-product is also produced by the reforming process. A sodium borohydride fuel cell is discussed in U.S. Pat. No. 4,261,956, which is incorporated by reference herein in its entirety.

One of the most important features for fuel cell application is fuel storage. Another important feature is to regulate the transport of fuel out of the fuel cartridge to the fuel cell. To be commercially useful, fuel cells such as DMFC or PEM systems should have the capability of storing sufficient fuel to satisfy the consumers' normal usage. For example, for mobile or cell phones, for notebook computers, and for personal digital assistants (PDAs), fuel cells need to power these devices for at least as long as the current batteries and, preferably, much longer. Additionally, the fuel cells should have easily replaceable or refillable fuel tanks to minimize or obviate the need for lengthy recharges required by today's rechargeable batteries.

One disadvantage of the known hydrogen gas generators is that once the reaction starts the gas generator cartridge cannot control the reaction. Thus, the reaction will continue until the supply of the reactants run out or the source of the reactant is manually shut down.

Accordingly, there is a desire to obtain a hydrogen gas generator apparatus that is capable of self-regulating the flow of at least one reactant into the reaction chamber and other devices to regulate the flow of fuel.

SUMMARY OF THE INVENTION

The present application is directed to a gas-generating apparatus and various pressure regulators or pressure-regulating valves. Hydrogen is generated within the gas-generating apparatus and is transported to a fuel cell. The transportation of a first fuel component to a second fuel component to generate of hydrogen occurs automatically depending on the pressure of a reaction chamber within the gas-generating apparatus. The pressure regulators, including flow orifices, are provided to regulate the hydrogen pressure and to minimize the fluctuation in pressure of the hydrogen received by the fuel cell. Connecting valves to connect the gas-generating apparatus to the fuel cell are also provided.

BRIEF DESCRIPTION OF THE DRAWINGS

In the accompanying drawings, which form a part of the specification and are to be read in conjunction therewith and in which like reference numerals are used to indicate like parts in the various views:

FIG. 1 is a cross-sectional schematic view of a gas-generating apparatus according to the present invention.

FIG. 2A is a cross-sectional view of a shut-off or connection valve for use in the gas-generating apparatus of FIG. 1 shown in the disconnected and closed position; FIG. 2B is a cross-sectional view of the shut-off valve shown in FIG. 2A shown in the connected and open position;

DETAILED DESCRIPTION OF THE INVENTION

Figure 1A:
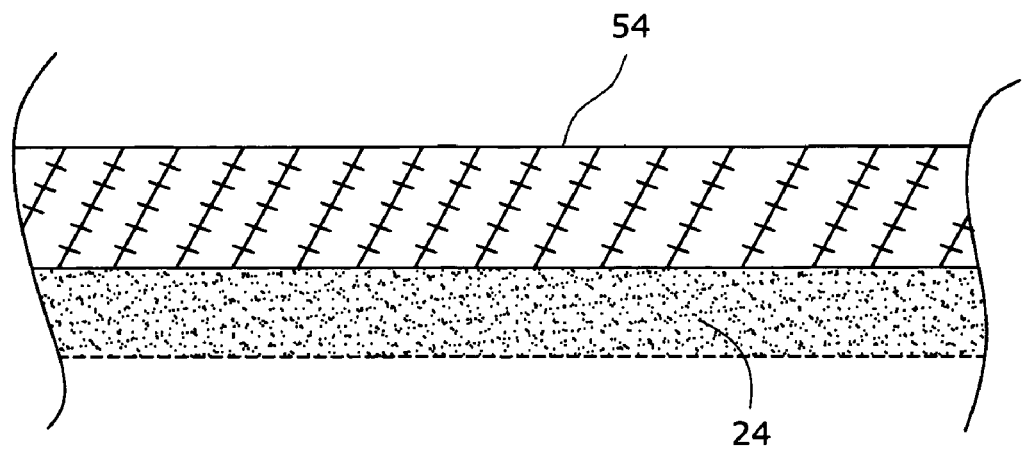
FIG. 1A is an enlarged partial cross-sectional view of a solid fuel container for use in the gas-generating apparatus of FIG. 1.

As illustrated in the accompanying drawings and discussed in detail below, the present invention is directed to a fuel supply, which stores fuel cell fuels, such as methanol and water, methanol/water mixture, methanol/water mixtures of varying concentrations, pure methanol, and/or methyl clathrates described in U.S. Pat. Nos. 5,364,977 and 6,512,005 B2, which are incorporated by reference herein in their entirety. Methanol and other alcohols are usable in many types of fuel cells, e.g., DMFC, enzyme fuel cells and reformat fuel cells, among others. The fuel supply may contain other types of fuel cell fuels, such as ethanol or alcohols; metal hydrides, such as sodium borohydrides; other chemicals that can be reformatted into hydrogen; or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in U.S. Pat. App. Pub. No. US 2003/0077493, entitled "Method of Using Fuel Cell System Configured to Provide Power to One or More Loads," published on Apr. 24, 2003, which is incorporated by reference herein in its entirety. Fuels can also include a mixture of methanol, hydrogen peroxide and sulfuric acid, which flows past a catalyst formed on silicon chips to create a fuel cell reaction. Moreover, fuels include a blend or mixture of methanol, sodium borohydride, an electrolyte, and other compounds, such as those described in U.S. Pat. Nos. 6,554,877, 6,562,497 and 6,758,871, which are incorporated by reference herein in their entireties. Furthermore, fuels include those compositions that are partially dissolved in a solvent and partially suspended in a solvent, described in U.S. Pat. No. 6,773,470 and those compositions that include both liquid fuel and solid fuels, described in U.S. Pat. Appl. Pub. No. US 2002/0076602. Suitable fuels are also disclosed in co-owned, co-pending U.S. Pat. Appl. No. 60/689,572, entitled "Fuels for Hydrogen-Generating Cartridges," filed on Jun. 13, 2005. These references are also incorporated by reference herein in their entireties.

Fuels can also include a metal hydride such as sodium borohydride ($NaBH_4$) and water, discussed above. Fuels can further include hydrocarbon fuels, which include, but are not limited to, butane, kerosene, alcohol, and natural gas, as set forth in U.S. Pat. Appl. Pub. No. US 2003/0096150, entitled "Liquid Hereto-Interface Fuel Cell Device," published on May 22, 2003, which is incorporated by reference herein in its entirety. Fuels can also include liquid oxidants that react with fuels. The present invention is therefore not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gaseous, liquids, solids, and/or chemicals including additives and catalysts and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply of the present invention can also be used to store fuels that are not used in fuel cells. These applications can include, but are not limited to, storing hydrocarbons and hydrogen fuels for micro gas-turbine engines built on silicon chips, discussed in "Here Come the Microengines," published in The Industrial Physicist (December 2001/January 2002) at pp. 20-25. As used in the present application, the term "fuel cell" can also include microengines. Other applications can include storing traditional fuels for internal combustion engines and hydrocarbons, such as butane for pocket and utility lighters and liquid propane.

Suitable known hydrogen-generating apparatus are disclosed in commonly-owned, co-pending U.S. Pat. Appl. Pub. No. US 2005-0074643 A1 and U.S. Pat. Appl. Pub. No. US 2005-0266281, and co-pending U.S. patent application Ser. No. 11/066,573 filed on Feb. 25, 2005. The disclosures of these references are incorporated by reference herein in their entireties.

The gas-generating apparatus of the present invention may include a reaction chamber, which may include an optional first reactant, and a reservoir having a second reactant. The first and second reactants can be a metal hydride, e.g., sodium borohydride, and water. The reactants can be in gaseous, liquid, aqueous or solid form. Preferably, the first reactant stored in the reaction chamber is a solid metal hydride or metal borohydride with selected additives and catalysts such as ruthenium, and the second reactant is water optionally mixed with selected additives and catalysts. Water and metal hydride of the present invention react to produce hydrogen gas, which can be consumed by a fuel cell to produce electricity. Other suitable reactants or reagents are disclosed in the parent applications, previously incorporated above.

Additionally, the gas-generating apparatus can include a device or system that is capable of controlling the transport of a second reactant from the reservoir to the reaction chamber. The operating conditions inside the reaction chamber and/or the reservoir, preferably a pressure inside the reaction chamber, are capable of controlling the transport of the second reactant in the reservoir to the reaction chamber. For example, the second reactant in the reservoir can be introduced into the reaction chamber when the pressure inside the reaction chamber is less than a predetermined value, preferably less than the pressure in the reservoir, and, more preferably less than the pressure in the reservoir by a predetermined amount. It is preferable that the flow of the second reactant from the reservoir into the reaction chamber is self-regulated. Thus, when the reaction chamber reaches a predetermined pressure, preferably a predetermined pressure above the pressure in the reservoir, the flow of the second reactant from the reservoir into the reaction chamber can be stopped to stop the production of hydrogen gas. Similarly, when the pressure of the reaction chamber is reduced below the pressure of the reservoir, preferably below the pressure in the reservoir by a predetermined amount, the second reactant can flow from the reservoir into the reaction chamber. The second reactant in the reservoir can be introduced into the reaction chamber by any known method including, but not limited to, pumping, osmosis, capillary action, pressure differential valves, other valve(s), or combinations thereof. The second reactant can also be pressurized with springs or pressurized liquids and gases. Preferably, the second reactant is pressurized with liquefied hydrocarbons, such as liquefied butane.

Referring to FIG. 1, an inventive fuel supply system is shown. The system includes a gas-generating apparatus 12 contained within a housing 13 and is configured to be connected to a fuel cell (not shown) via a fuel conduit 16 and a valve 34. Preferably, fuel conduit 16 initiates within gas-generating apparatus 12, and valve 34 is in fluid communication with conduit 16. Fuel conduit 16 can be a flexible tube, such as a plastic or rubber tube, or can be a substantially rigid part connected to housing 13.

Within housing 13, gas-generating apparatus 12 preferably includes two main compartments: a fluid fuel component reservoir 44 containing a fluid fuel component 22 and a reaction chamber 18 containing a solid fuel component 24. Reservoir 44 and reaction chamber 18 are sealed off from one another until the production of a fuel gas, such as hydrogen, is desired by reacting fluid fuel component 22 with solid fuel component 24. Housing 13 is preferably divided by interior wall 19 to form fluid reservoir 44 and reaction chamber 18.

Reservoir 44 may preferably, however, include a liner, bladder or similar fluid container 21 to contain fluid or liquid fuel component 22 as shown. Fluid fuel component 22 preferably includes water and/or an additive/catalyst or other liquid reactants. Additional appropriate fluid fuel components and additives are further discussed herein. Suitable additives/catalysts include, but are not limited to, anti-freezing agents (e.g., methanol, ethanol, propanol and other alcohols), catalysts (e.g., cobalt chloride and other known catalysts), pH adjusting agents (e.g., acids such as sulfuric acid and other common acids). Preferably, fluid fuel component 22 is pressurized, such as by springs or by pressurized/liquefied gas (butane or propane), although it may also be unpressurized. When liquefied hydrocarbon is used, it is injected into reservoir 44 and is contained in the space between liner 21 and housing 13.

Reservoir 44 and reaction chamber 18 are fluidly connected by a fluid transfer conduit 88. Fluid transfer conduit 88 is connected to conduit 15, which is in fluid communication with liquid fuel component 22 within liner 21, and one or more conduits 17, which brings the liquid fuel component 22 into contact with the solid fuel component 24. Orifice 15 can be connected directly to conduit 88, or as shown in FIG. 1 it can be connected to a channel 84 defined on the outside surface of plug 86 which defines conduit 88 therewithin. Hole 87 connects surface channel 84 to conduit 88. The function of plug 86 is further defined hereafter. Fluid transfer conduit 88 can also be a channel or similar void formed in housing 13, or external tubing located outside of housing 13. Other configurations are also appropriate.

Reaction chamber 18 is contained within housing 13 and separated from fluid fuel component reservoir 44 by interior wall 19 and is preferably made of a fluid impenetrable material, such as a metal, for example, stainless steel, or a resin or plastic material. As liquid fuel component 22 and solid fuel component 24 are mixed within reaction chamber 18 to produce a fuel gas, such as hydrogen, reaction chamber 18 also preferably includes a pressure relief valve 52 located in housing 13. Pressure relief valve 52 is preferably a pressure-triggered valve, such as a check valve or a duckbill valve, which automatically vents produced fuel gas should the pressure within reaction chamber, $P_{18}$, reach a specified triggering pressure. Another pressure relief valve can be installed on fluid fuel component reservoir 44.

Solid fuel component 24, which can be powders, granules, or other solid forms, is disposed within a solid fuel container 23, which, in this embodiment, is a gas permeable bladder, liner or bag. Fillers and other additives and chemicals can be added to solid fuel component 24 to improve its reaction with the liquid reactant. Preferably, additives that can be corrosive to valves and other elements within fluid transfer conduit 88, conduits 15 and 17 should be included with solid fuel 24. Solid fuel component 24 is packed inside solid fuel container 23, which is preferably cinched or wrapped tightly around one or more fluid dispersion elements 89; for example with rubber or elastic bands, such as rubber or metal bands, with heat shrunk wraps, pressure adhesive tapes or the like. Solid fuel container 23 can also be formed by thermoform. In one example, solid fuel container 23 comprises a plurality of films that are selectively perforated to control the flow of liquid reactant, gas and/or by-products therethrough. Each fluid dispersion element 89 is in fluid communication with conduits 17, within which the liquid fuel is transported to the solid fuel. Dispersion element 89 is preferably a rigid tube-like hollow structure made of a non-reactive material having openings 91 along its length and at its tip to assist in the maximum dispersal of fluid fuel component 22 to contact solid fuel component 24. Preferably, at least some of the openings 91 in fluid dispersion element 89 include capillary fluid conduits 90, which are relatively small tubular extensions to disperse the fluid even more effectively throughout solid fuel component 24. Capillary conduits 90 can be fillers, fibers, fibrils or other capillary conduits. Each fluid dispersion element 89 is supported within reaction chamber 18 by a mount 85, which is also the point at which fluid dispersion element 89 is connected to conduits 17 and to fluid transfer conduit 88.

The inner diameter of fluid dispersion element 89 is sized and dimensioned to control the volume and speed that liquid fuel component 22 is transported therethrough. In certain instances, the effective inner diameter of element 89 needs to be sufficiently small, such that the manufacture of such a small tube may be difficult or expensive. In such instances, a larger tube 89a can be used with a smaller rod 89b disposed within the larger tube 89a to reduce the effective inner diameter of the larger tube 89a. The liquid fuel component is transported through the annular space 89c between the tube and the inner rod, as shown in FIG. 1D.

In another embodiment, to increase the permeability of the liquid fuel component 22 through the solid fuel component 24, hydrophilic materials, such as fibers, foam chopped fibers or other wicking materials, can be intermixed with the solid fuel component 24. The hydrophilic materials can form an interconnected network within solid fuel component 24, but the hydrophilic materials do not need to contact each other within the solid fuel component to improve permeability.

Solid fuel container 23 may be made of many materials and can be flexible or substantially rigid. In the embodiment shown in FIG. 1A, solid fuel container 23 is preferably made of a single layer 54 of a gas-permeable, liquid impermeable material such as CELGARD® and GORE-TEX®. Other gas permeable, liquid impermeable materials usable in the present invention include, but are not limited to, SURBENT® Polyvinylidene Fluoride (PVDF) having a porous size of from about 0.1 µm to about 0.45 µm, available from Millipore Corporation. The pore size of SURBENT® PVDF regulates the amount of liquid fuel component 22 or water exiting the system. Materials such as electronic vent-type material having 0.2 µm hydro, available from W. L. Gore & Associates, Inc., may also be used in the present invention. Additionally, sintered and/or ceramic porous materials having a pore size of less than about 10 µm, available from Applied Porous Technologies Inc., are also usable in the present invention. Additionally, or alternatively, the gas permeable, liquid impermeable materials disclosed in commonly owned, co-pending U.S. patent application Ser. No. 10/356,793 are also usable in the present invention, all of which are incorporated by reference herein in their entireties. Using such materials allows for the fuel gas produced by the mixing of fluid fuel component 22 and solid fuel component 24 to vent through solid fuel container 23 and into reaction chamber 18 for transfer to the fuel cell (not shown), while restricting the liquid and/or paste-like by-products of the chemical reaction to the interior of solid fuel container 23.

Figure 1B:
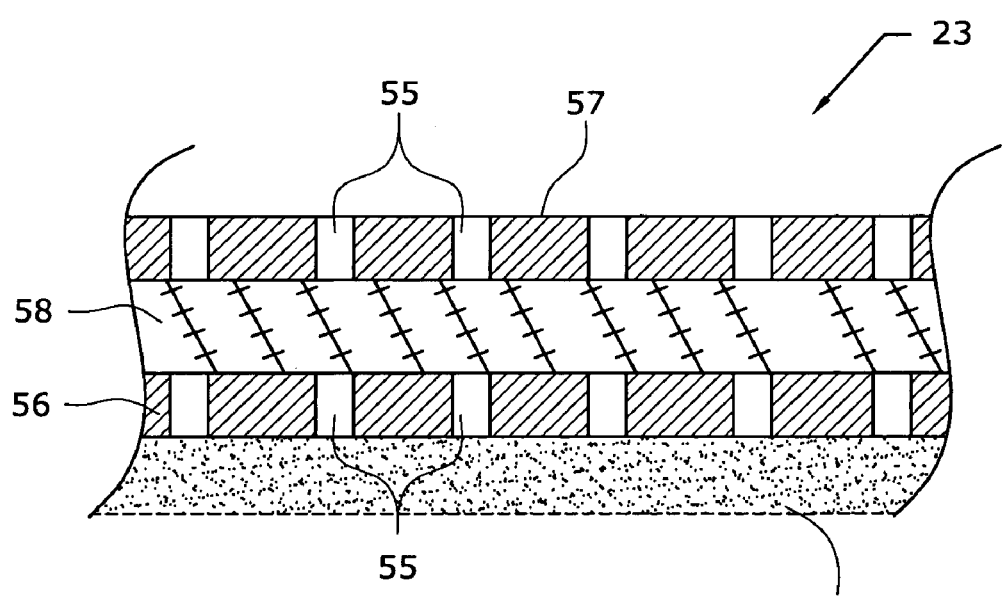
FIG. 1B is an enlarged partial cross-sectional view of an alternate solid fuel container for use in the gas-generating apparatus of FIG. 1.

FIG. 1B shows an alternate construction for solid fuel container 23. In this embodiment, the walls of solid fuel container 23 are made of multiple layers: an outer layer 57 and an inner layer 56 separated by an absorbent layer 58. Both inner layer 56 and outer layer 57 may be made of any material known in the art capable of having at least one slit 55 formed therein. Slits 55 are openings in inner layer 56 and outer layer 57 to allow the produced fuel gas to vent from solid fuel container 23. To minimize the amount of fluid fuel component 22 and/or paste-like by-products that may exit through slits 55, absorbent layer 58 is positioned between inner layer 56 and outer layer 57 to form a barrier. Absorbent layer 58 may be made from any absorbent material known in the art, but is preferably capable of absorbing liquid while allowing gas to pass through the material. One example of such a material is paper fluff containing sodium polyacrylate crystals; such a material is commonly used in diapers. Other examples include, but are not limited to, fillers, non-wovens, papers and foams. As will be recognized by those in the art, solid fuel container 23 may include any number of layers, alternating between layers containing slits 55 and absorbent layers.

Figure 1C:
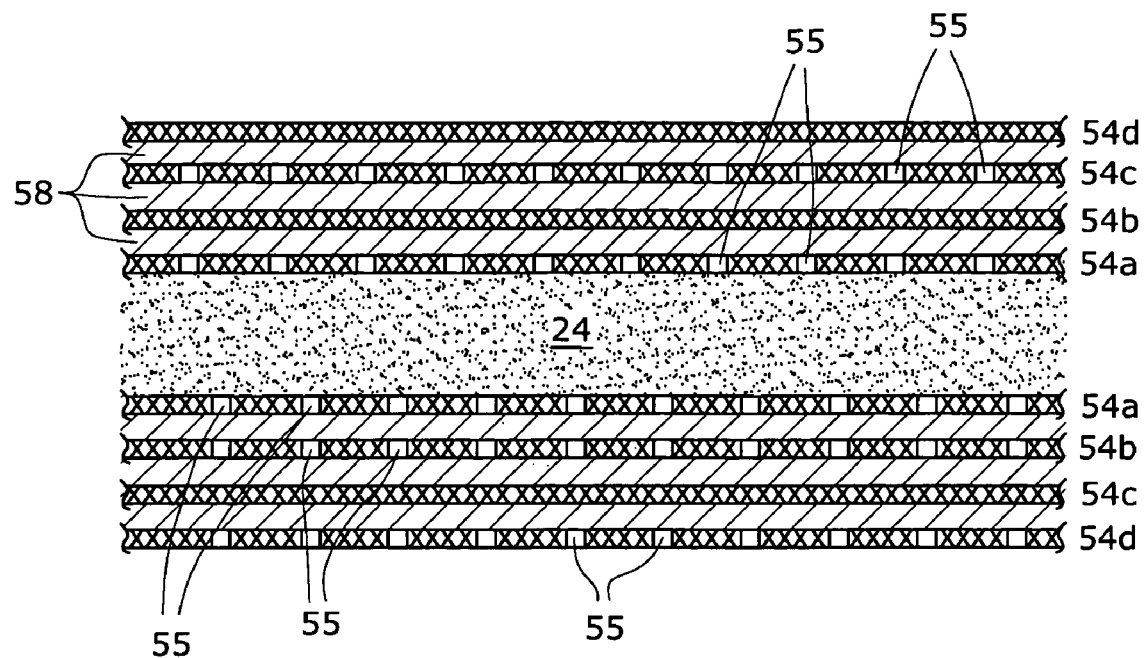
FIG. 1C is an alternate embodiment of FIG. 1B.
Figure 1D:
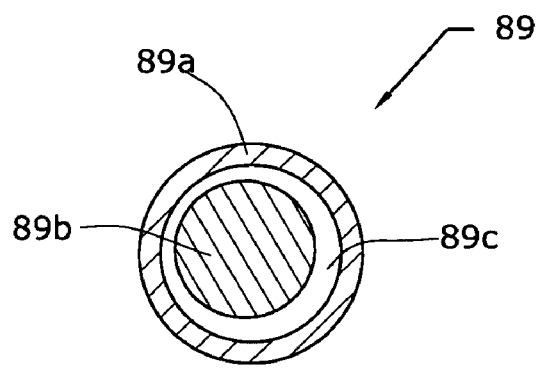
FIG. 1D is a cross-sectional view of an alternate embodiment of a fluid conduit.

In one example shown in FIG. 1C, solid fuel component 24 is encased in four layers 54a, 54b, 54c and 54d. These layers are preferably gas permeable and liquid impermeable. Alternatively, each layer can be made from any material with a plurality of holes or slits 55, as shown, to allow the produced gas to pass through. Disposed between adjacent layers 54a-d are absorbent layers 58. In this embodiment, the flow path for the produced gas and the by-products, if any, is made tortuous to encourage more liquid fuel component 22 to remain in contact with solid fuel component 24 longer to produce more gas. As shown, while the innermost layer 54a is perforated on both sides, the next layer 54b is perforated only on one side. The next layer 54c is also perforated on one side, but opposite to the perforated side of layer 54b. Layer 54d is perforated on one side, but opposite to the perforated side of layer 54c and so on. Alternatively, instead of using partially perforated layers 54a-b wrapping around solid fuel component 24, liners or bags made with a permeable portion and non-permeable portion can be used instead, with the permeable portion of one liner located opposite from the permeable portion of the next outer layer.

Disposed within fluid transfer conduit 88 is preferably a fluid transfer valve 33 to control the flow of fluid fuel component 22 into reaction chamber 18. Fluid transfer valve 33 may be any type of pressure-opened, one-way valve known in the art, such as a check valve (as shown in FIG. 1), a solenoid valve, a duckbill valve, a valve having a pressure responsive diaphragm, which opens when a threshold pressure is reached. Fluid transfer valve 33 may be opened by user intervention and/or triggered automatically by pressurized fluid fuel component 22. In other words, fluid transfer valve 33 acts as an "on/off" switch for triggering the transfer of fluid fuel component 22 to reaction chamber 18. In this embodiment, a fluid transfer valve 33 is a check valve including a biasing spring 35 pushing a ball 36 against a sealing surface 37. Preferably, a deformable sealing member 39 such as an O-ring is also included to assure a seal. Shown as overlapped areas in FIG. 1 are the portions of valve 33 that would be compressed to form a seal. Plug 86, discussed above, is used in an exemplary method of assembling valve 33. A channel is formed in the bottom end of housing 13 for fluid transfer conduit 88. First, spring 35 is inserted in this channel, followed by ball 36 and sealing member 39. Plug 86 is finally inserted in this channel to compress spring 35 and presses against ball 36 and sealing member 39 to form a seal with valve 33. Parts of plug 86, i.e., hole 87 and peripheral channel 84, connect fluid transfer conduit 88 to conduit 15 to reach liquid fuel component 22.

In this embodiment, fluid transfer valve 33 opens when the fluid pressure within reservoir 44 exceeds the pressure of reaction chamber 18 by a predetermined amount. As reservoir 44 is preferably pressurized, this triggering pressure is exceeded immediately upon pressurizing reservoir 44. To stop fluid transfer valve 33 from opening before fuel gas is desired to be produced, a stopping mechanism (not shown), such as a latch or a pull tab, may be included, so that the first user of fuel supply 12 may start the transfer of fluid fuel component 22 by releasing the stopping mechanism. Alternatively, chamber 18 is pressurized with an inert gas or hydrogen to equalize the pressure across valve 33 within said predetermined amount.

Fuel conduit 16 is attached to housing 13 as shown by any method known in the art. Optionally, a gas-permeable, liquid impermeable membrane 32 may be affixed over the reaction chamber-facing side of conduit 16. Membrane 32 limits the amount of liquids or by-products from being transferred out of gas generating apparatus 12 to the fuel cell via fuel conduit 16. Fillers or foam can be used in combination with membrane 32 to retain liquids or by-products and to reduce clogging. Membrane 32 may be formed from any liquid impermeable, gas permeable material known to one skilled in the art. Such materials can include, but are not limited to, hydrophobic materials having an alkane group. More specific examples include, but are not limited to: polyethylene compositions, polytetrafluoroethylene, polypropylene, polyglactin (VICRY®), lyophilized dura mater, or combinations thereof. Gas permeable member 32 may also comprise a gas permeable/liquid impermeable membrane covering a porous member. Such a membrane 32 may be used in any of the embodiments discussed herein. Valve 34 can be any valve, such as a pressure-triggered valve (a check valve or a duckbill valve) or a pressure-regulating valve or pressure regulator described below. When valve 34 is a pressure-triggered valve (such as valve 33), no fuel can be transferred until $P_{18}$ reaches a threshold pressure. Valve 34 may be positioned in fuel conduit 16 as shown in FIG. 1, or can be located remote from gas-generating device 12.

A connection valve or shut-off valve 27 may also be included, preferably in fluid communication with valve 34. As shown in FIG. 2A, connection valve 27 is preferably a separable valve having a first valve component 60 and a second valve component 62. Each valve component 60, 62 has an internal seal. Further, first valve component 60 and second valve component 62 are configured to form an inter-component seal therebetween before being opened. Connection valve 27 is similar to the shut-off valves described in parent '006 application. Connection valve 27 is shaped and dimensioned for transporting gas.

First valve component 60 includes a housing 61 and housing 61 defines a first flow path 79 through its interior. Disposed within first flow path 79 is a first slidable body 64. Slidable body 64 is configured to seal first flow path 79 by pressing a sealing surface 69 against a deformable sealing member 70, such as an O-ring, disposed in first flow path 79 near a shoulder 82 formed by the configuration of first flow path 79. Slidable body 64 is biased toward shoulder 82 formed on a second end of first valve component 60 to secure the seal formed at sealing surface 69. Slidable body 64 will remain in this biased position until first valve component 60 and second valve component 62 are engaged. Alternatively, slidable body 64 is made from an elastomeric material to form a seal and sealing member 70 can be omitted.

An elongated member 65 extends from one end of slidable body 64, as shown. Elongated member 65 is a needle-like extension that protrudes from housing 61. Elongated member 65 is preferably covered with a tubular sealing surface 67. A space or void is formed in the annular space between elongated member 65 and tubular sealing surface 67 to extend first flow path 79 outside of housing 61. Tubular sealing surface 67 is connected to elongated member 65 with optional spacers or ribs (not shown) so as not to close off first flow path 79. Elongated member 65 and tubular sealing surface 67 are configured to be inserted into second valve component 62.

Second valve component 62 is similar to first valve component 60 and includes a housing 63 made of a substantially rigid material. Housing 63 defines a second flow path 80 through its interior. Disposed within second flow path 80 is a second slidable body 74. Slidable body 74 is configured to seal second flow path 80 by pressing a sealing surface 75 against a deformable sealing member 73 near a shoulder 83. Slidable body 74 is biased to the sealing position by spring 76. Second valve component 62 thus remains sealed until first valve component 60 and second valve component 62 are correctly connected. Alternatively, slidable body 74 is made from an elastomeric material to form a seal and sealing member 73 can be omitted.

A pin 81 extends from the other end of slidable body 74. Pin 81 is a needle-like extension and remains within housing 63, and does not seal second flow path 80. Pin 81 is also sized and dimensioned to engage with elongated member 65 when first valve component 60 and second valve component 62 are engaged. A sealing member 71, such as an O-ring, may be positioned between pin 81 and the interface end of second valve component 62 so that a seal is formed around tubular sealing surface 67 before and during the period when first valve component 60 and second valve component 62 are engaged.

To open first valve component 60 and second valve component 62 to form a single flow path therethrough, first valve component 60 is inserted into second valve component 62 or vice versa. As the two valve components 60, 62 are pushed together, elongated member 65 engages with pin 81, which press against each other to move first slidable body 64 away from shoulder 82 and second slidable body 74 away from shoulder 83. As such, sealing members 70 and 73 are disengaged to allow fluid to flow through first flow path 79 and second flow path 80, as shown in FIG. 2B.

First valve component 60 and second valve component 62 are configured such that an inter-component seal is formed between tubular sealing surface 67 and sealing member 71, before preferably either sealing surface 69 of first slidable body 64 or sealing surface 75 of second slidable body 74 are disengaged from sealing members 70 and 73, respectively.

A first end of housing 61 and a second end of housing 63 preferably include barbs 92*a* and 92*b*, respectively, for easy and secure insertion into fuel conduit 16. Alternatively, barbs 92*a* and 92*b* may be any secure connector known in the art, such as threaded connectors or press fit connectors. Additional configurations for connection valves are more fully described in the parent '006 application, also published as U.S. Pat. App. Pub. US 2005/0022883 A1, previously incorporated by reference.

Retainer 77 is positioned on the interface end of second valve component 62. Retainer 77 may also be a sealing member, such as an O-ring, a gasket, a viscous gel, or the like.

Retainer/sealing member 77 is configured to engage front sealing surface 78 on first valve component 60 to provide another inter-component seal.

One of valve components 60 and 62 can be integrated with a fuel supply, and the other valve component can be connected to a fuel cell or a device powered by the fuel cell. Either valve component 60 and/or 62 can also be integrated with a flow or pressure regulator or pressure-regulating valve, discussed below.

Before the first use, fluid transfer valve 33, as shown in FIG. 1, is opened either by removing a pull tab or latch or by removing the initial pressurized gas in chamber 18. Pressurized fluid fuel component 22 is transferred into reaction chamber 18 via fluid transfer conduit 88 to react with solid fuel component 24. Pressurized fluid fuel component 22 passes through an orifice 15 and into fluid transfer conduit 88. While fluid transfer valve 33 is opened, fluid fuel component 22 is continually fed into reaction chamber 18 to create the fuel gas that is then transferred to the fuel cell or the device through fuel conduit 16. In one embodiment, to halt the production of additional gas, fluid transfer valve 33 can be manually shut-off.

In another embodiment, one of several pressure-regulating devices may be employed within gas-generating apparatus 12 to allow for the automatic and dynamic control of gas generation. This is accomplished in general by allowing the reaction chamber pressure $P_{18}$ to control the inflow of fluid fuel component 22 using fluid transfer valve 33 and/or one or more pressure-regulating valve 26, as described below.

Figure 3:
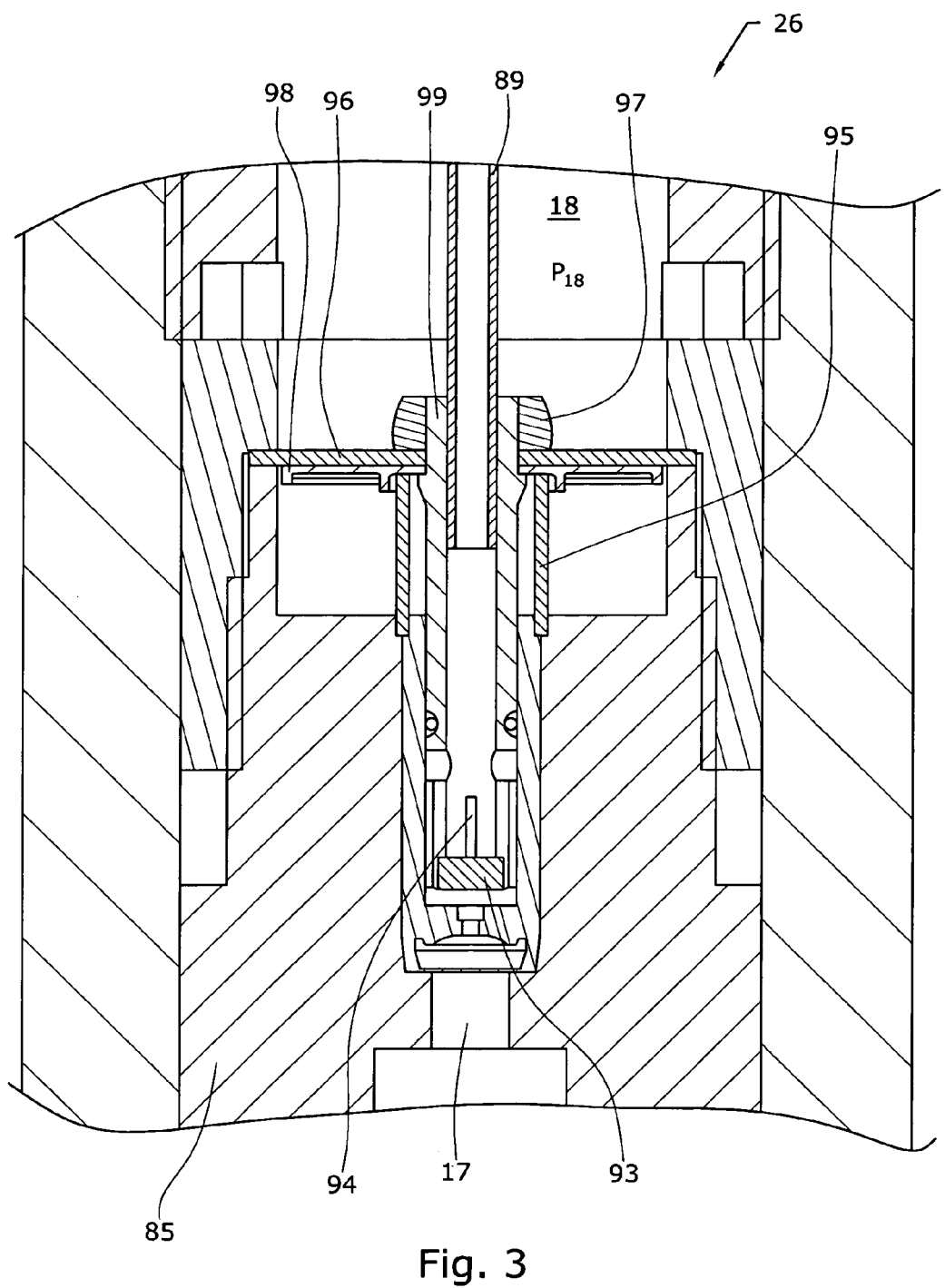
FIG. 3 is a cross-sectional view of a pressure-regulated fluid nozzle or valve for use in the gas-generating apparatus of FIG. 1.

In one embodiment, as shown in FIG. 3, pressure-regulating valve 26 is positioned in mount 85 or conduits 17 and generally acts as an inlet port between fluid transfer conduit 88 and fluid dispersion element 89. Pressure-regulating valve 26 can also be positioned in conduit 88 or conduit 15. An end of fluid dispersion element 89 is connected to a carrier 99, which is slidably disposed within mount 85. Near where fluid transfer conduit 17 terminates, one end of carrier 99 is in contact with a globe seal 93 surrounding a jet 94. Jet 94 is fluidly connected to conduit 17, and globe seal 93 is configured to control the fluid connection therebetween. As shown in FIG. 3, valve 26 is in an open configuration, so fluid would be able to flow from fluid transfer conduit 88 into jet 94.

The other end of carrier 99 is connected to a pressure actuated system including a diaphragm 96 exposed to reaction chamber 18 and reaction chamber pressure $P_{18}$, a spring 95 biasing diaphragm 96 towards reaction chamber 18, and a support plate 98. Carrier 99 is engaged with support plate 98. Diaphragm 96 may be any type of pressure-sensitive diaphragm known in the art, such as a thin rubber, metal or elastomeric sheet. When reaction chamber pressure $P_{18}$ increases due to the production of fuel gas, diaphragm 96 tends to deform and expand toward the base of mount 85, but is held in place by the force $F_{95}$ from spring 95. When reaction chamber pressure $P_{18}$ exceeds the biasing force $F_{95}$ provided by spring 95, diaphragm 96 pushes support plate 98 toward the base of mount 85. As carrier 99 is engaged with support plate 98, carrier 99 also moves toward the base of mount 85. This motion deforms globe seal 93 to seal the connection between fluid transfer conduit 88 and jet 94, thereby cutting off the flow of fluid fuel component 22 into reaction chamber 18.

While valve 33 (shown in FIG. 1) is open, the operation of gas-generating apparatus 12 may therefore happen in a dynamic and cyclical fashion to provide on demand fuel to the fuel cell. When valve 33 is initially opened, reaction chamber pressure $P_{18}$ is low, so pressure-regulating valve 26 is fully open. Valves 33 and 26 may have substantially similar pressure differentials for opening and closing, and in the preferred embodiment one valve may act as a backup for the other. Alternatively, the opening pressure differentials may be different, i.e., the differential pressure to open or close valve 33 may be higher or lower than that of valve 26, to provide additional ways to control the flow through conduit 88.

As fluid fuel component 22 is fed into reaction chamber via valve 26 and/or valve 33 and fluid dispersal elements 89, the reaction between fluid fuel component 22 and solid fuel component 24 begins to generate fuel gas. Reaction chamber pressure $P_{18}$ gradually increases with the build up of fuel gas until threshold pressure $P_{34}$ is reached and valve 34 opens to allow the flow of gas through fuel conduit 16. Fuel gas is then transferred out of reaction chamber 18. While this process may reach a steady state, the production of gas may outpace the transfer of gas through valve 34, or, alternatively, valve 34 or another downstream valve may be manually closed by a user or electronically closed by the fuel cell or host device. In such a situation, reaction chamber pressure $P_{18}$ may continue to build until reaction chamber pressure $P_{18}$ exceeds the force $F_{95}$ supplied by spring 95. At this point, diaphragm 96 deforms toward the base of mount 85, thereby driving carrier 99 toward the base of mount 85. As described above, this action causes globe seal 93 to seal the connection between fluid transfer conduit 88 and jet 94. As no additional fluid fuel component 22 may be introduced into reaction chamber 18, the production of fuel gas slows and eventually stops. Valve 33 can also be closed by $P_{18}$, i.e., when $P_{18}$ exceeds $P_{44}$ or when the difference between $P_{18}$ and $P_{44}$ is less than a predetermined amount, e.g., the amount of force exerted by spring 35.

If valve 34 is still open, or if it is re-opened, fuel gas is then transferred out of reaction chamber 18, so that reaction chamber pressure $P_{18}$ decreases. Eventually, reaction chamber pressure $P_{18}$ decreases below the force $F_{95}$ provided by spring 95, which pushes support 98 toward reaction chamber 18. As support 98 is engaged with carrier 99, carrier 99 also slides toward reaction chamber 18, which allows globe seal 93 to return to its unsealed configuration. Consequently, additional fluid fuel component 22 begins to flow through jet 94 and into reaction chamber via fluid dispersal element 89. New fuel gas is produced, and reaction chamber pressure $P_{18}$ rises once again. Similarly, when $P_{18}$ is less than $P_{44}$, or is less than $P_{44}$ by a predetermined amount, then valve 33 opens to allow fluid fuel component 22 to flow.

This dynamic operation is summarized below in Table 1, when valve 33 is opened manually, or when valve 33 and valve 26 have substantially the same differential triggering pressure so that one valve backs up the other valve.

TABLE 1

Pressure Cycle of Gas-Generating Apparatus with Valve 33 Open or Omitted

| Pressure Balance | Condition of Pressure-regulating Valve 26 | State of Gas Production, Pressure in Reaction Chamber 18 |
|---|---|---|
| $P_{44} > P_{18}$<br>$F_{95} > P_{18}$<br>$P_{18} < P_{34}$ | OPEN | Gas production starts; Pressure builds |
| $P_{44} \geq P_{18}$<br>$F_{95} \geq P_{18}$<br>$P_{18} = P_{34}$ | OPEN | Gas production continues; Pressure builds if production outpaces outflow |
| $P_{44} \leq P_{18}$<br>$F_{95} \leq P_{18}$ | CLOSED | Gas production slows to halt; Pressure |

TABLE 1-continued

Pressure Cycle of Gas-Generating Apparatus with Valve 33 Open or Omitted

| Pressure Balance | Condition of Pressure-regulating Valve 26 | State of Gas Production, Pressure in Reaction Chamber 18 |
|---|---|---|
| $P_{18} \geqq P_{34}$<br>$P_{44} > P_{18}$<br>$F_{95} > P_{18}$<br>$P_{18} < P_{34}$ | OPEN | decreases<br>Gas production starts again |

TABLE 2

Pressure Cycle of Gas-Generating Apparatus with Valve 26 Open or Omitted

| Pressure Balance | Condition of Pressure-regulating Valve 33 | State of Gas Production, Pressure in Reaction Chamber 18 |
|---|---|---|
| $P_{44} > P_{18}$<br>$P_{18} < P_{34}$ | OPEN | Gas production starts; Pressure builds |
| $P_{44} \geqq P_{18}$<br>$P_{18} = P_{34}$ | OPEN | Gas production continues; Pressure builds if production outpaces outflow |
| $P_{44} \leqq P_{18}$<br>$P_{18} \geqq P_{34}$ | CLOSED | Gas production slows to halt; Pressure decreases |
| $P_{44} > P_{18}$<br>$P_{18} < P_{34}$ | OPEN | Gas production starts again |

Figure 4A:
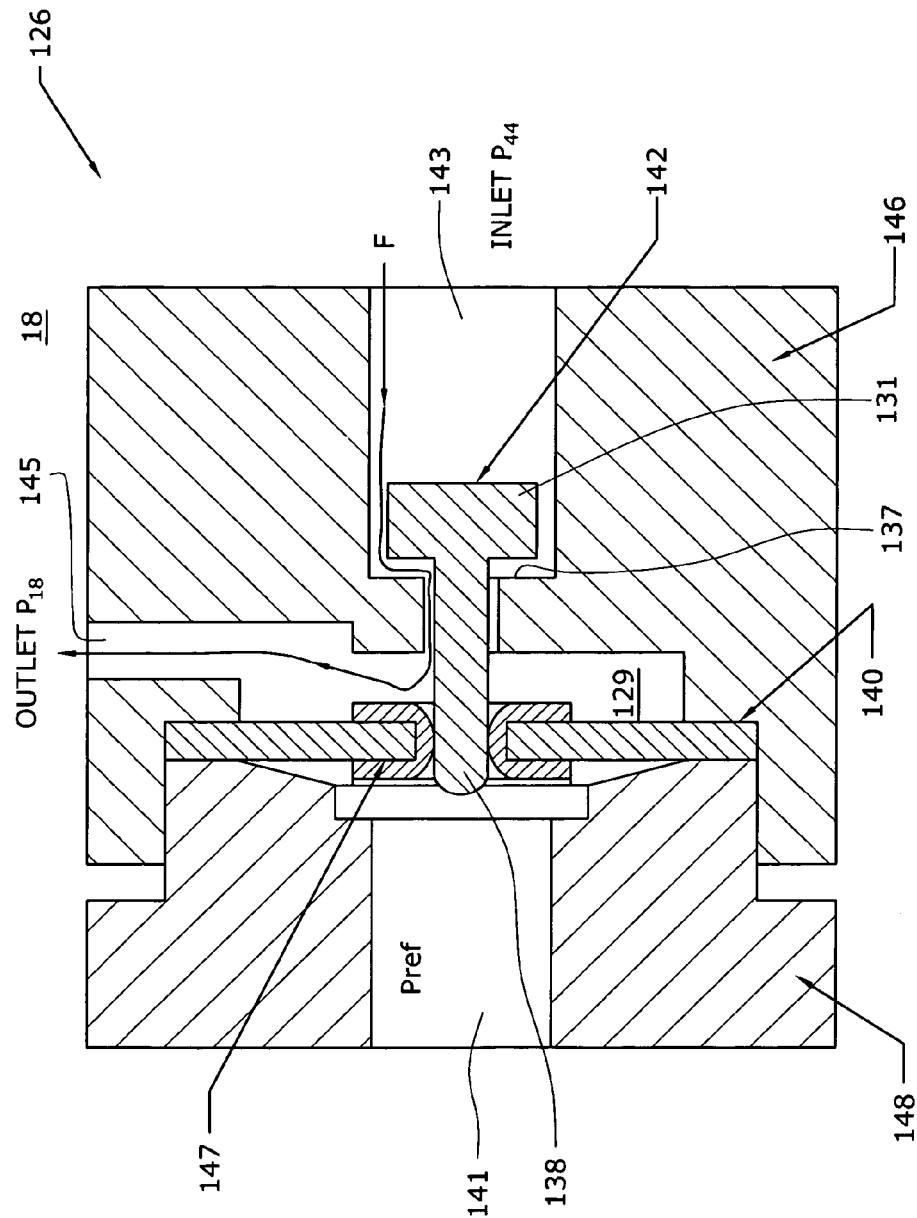
FIG. 4A is a cross-sectional view of a pressure-regulating valve for use in the gas-generating apparatus of FIG. 1.
Figure 4B:
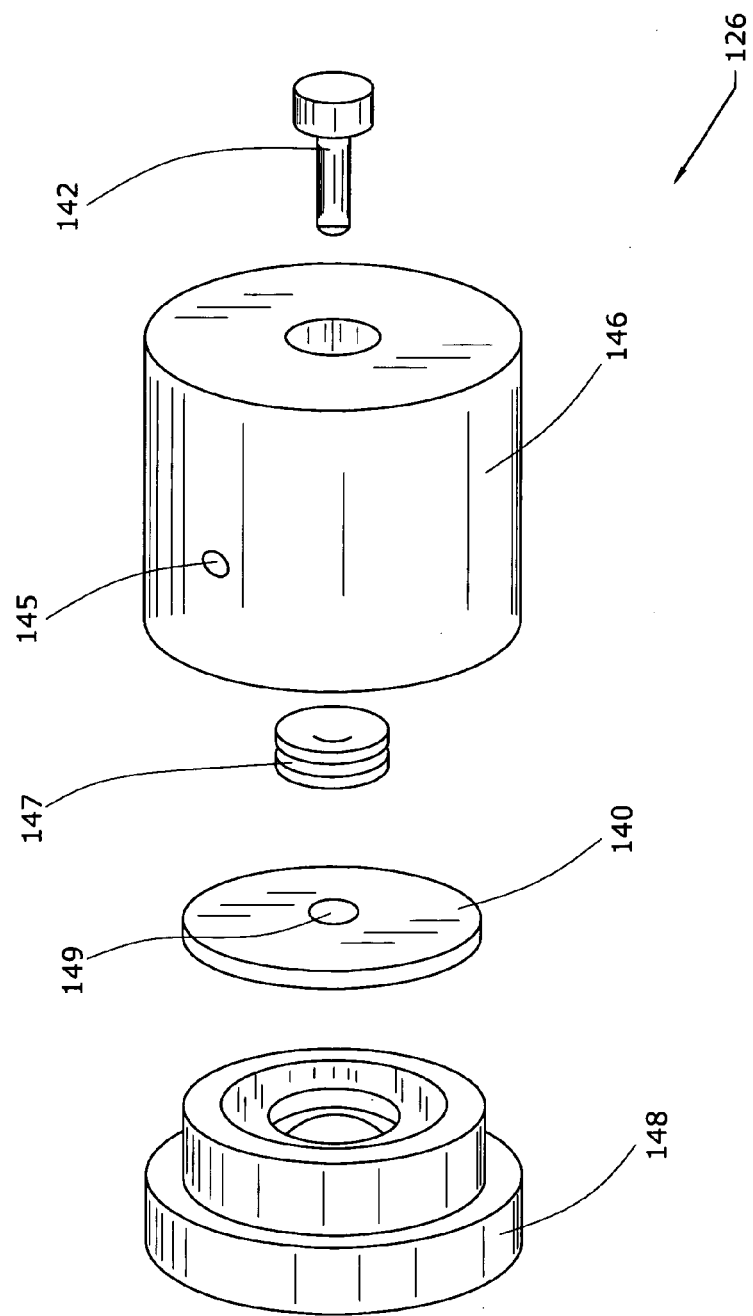
FIG. 4B is an exploded perspective view of the pressure-regulating valve of FIG. 4A.

Referring to FIGS. 4A and 4B, another suitable pressure regulator or regulating valve 126 is shown. Pressure-regulating valve 126 can be positioned within fluid transfer conduit 88, similar to the positioning of fluid transfer valve 33 as shown in FIG. 1. Pressure-regulating valve 126 is preferably placed in series with fluid transfer valve 33, or pressure-regulating valve 126 may replace fluid transfer valve 33. Valve 126 can be used with other cartridges or hydrogen generators and can act as a pressure regulator. In another embodiment, regulating valve 126 can replace valve 34. Regulating valve 126 can be connected to or be a part of the fuel cell or the device that houses the fuel cell. Regulating valve 126 can be located either upstream or downstream of valve components 60 and 62 of connection or shut-off valve 27.

Similar to pressure-regulating valve 26, discussed above, pressure-regulating valve 126 includes a pressure sensitive diaphragm 140. Diaphragm 140 is similar to diaphragm 96 described above. In this embodiment, however, diaphragm 140 is sandwiched between two housing elements, a valve housing 146 and a valve cover 148, and has a hole 149 formed through its center, as best seen in FIG. 4A. Additionally, a void 129 is formed at the interface of valve housing 146 and valve cover 148 to allow diaphragm 140 to move or flex due to the pressure difference between the inlet pressure at channel 143, the outlet pressure at channel 145, and a reference pressure, Pref. Valve housing 146 has an internal configuration that defines a flow path through regulator valve 126. Specifically, channels 143 and 145 are formed in valve housing 146, where channel 143 is exposed to the inlet pressure and channel 145 is exposed to the outlet pressure. Further, a vent channel 141 is formed in valve cover 148 so that diaphragm 140 is exposed to the reference pressure, which may be atmospheric pressure.

Valve housing channel 143 is configured to slidingly receive a valve stem 142. Valve housing channel 143 is configured to narrow at or near the interface of valve housing 146 and valve cover 148 to form a shoulder 137. Valve stem 142 is preferably a unitary element having a slender stem portion 138 and a cap 131. This configuration allows slender stem portion 138 to extend through the narrow portion of valve housing channel 143 while cap 131 comes to rest against shoulder 137. As such, cap 131 and shoulder 137 both include sealing surfaces to close the flow path through valve 126 at shoulder 137 when cap 131 is seated thereagainst. Additionally, a grommet 147 secures valve stem 142 within hole 149 in diaphragm 140, thereby creating a seal and a secure connection between diaphragm 140 and valve stem 142. Therefore, as diaphragm 140 moves, valve stem 142 also moves such that cap 131 is seated and unseated against shoulder 137 thereby opening and closing valve 126.

When pressure-regulating valve 126 is positioned in conduit 88 of gas-generating apparatus 12, reaction chamber pressure $P_{18}$ provides the outlet pressure at channel 145 and reservoir pressure $P_{44}$ provides the inlet pressure at channel 143. When reaction chamber pressure $P_{18}$ is low, valve 126 is in an open configuration as shown in FIG. 4A, where diaphragm is unflexed and cap 131 of valve stem 142 is unseated from shoulder 137. As such, fluid fuel component 22 (shown in FIG. 1) flows through valve 126 and into fluid dispersal element 89 (shown in FIG. 1), assuming that fluid transfer valve 33 is also open. The introduction of fluid fuel component 22 to solid fuel component 24 starts the production of fuel gas, which seeps through solid fuel container 23 (shown in FIG. 1) and into reaction chamber 18, as described above. Reaction chamber pressure $P_{18}$ begins to rise. The pressure within conduit 145 rises with $P_{18}$ and translates into void 129. Reaction chamber pressure $P_{18}$ gradually increases with the buildup of fuel gas until threshold pressure $P_{34}$ is reached and valve 34 (shown in FIG. 1) opens to allow the flow of gas through fuel conduit 16 (shown in FIG. 1). Fuel gas is then transferred out of reaction chamber 18. While this process may reach a steady state, the production of gas may outpace the transfer of gas through valve 34, or, alternatively, valve 34 or valve 27 may be manually or electronically closed. In such a situation, reaction chamber pressure $P_{18}$ may continue to build until reaction chamber pressure $P_{18}$ exceeds $P_{ref}$, $P_{44}$ or ($P_{44}$ less $P_{ref}$) as no further gas is transferred from reaction chamber 18 with valve 34 (or valves 34, 27) closed. As a result of the rising reaction chamber pressure $P_{18}$, diaphragm 140 deforms toward valve cover 148. If reaction chamber pressure $P_{18}$ continues to rise, diaphragm 140 deforms toward valve cover 148 to such an extent that cap 131 of valve stem 142 seats against shoulder 137 to seal valve 126. As such, the flow of additional fluid fuel component is halted, which slows and eventually stops the production of fuel gas in reaction chamber 18.

If valve 34 remains open, fuel gas is transferred out of reaction chamber 18, which reduces the reaction chamber pressure $P_{18}$. This reduction in reaction chamber pressure $P_{18}$ is transferred to void 129 by conduit 145, and diaphragm 140 starts to return to its original configuration as the pressure differential thereacross begins to equalize, i.e., $P_{18}$, $P_{44}$ and $P_{ref}$ begin to balance. As diaphragm 140 moves back into position, valve stem 142 is also moved, thereby unseating cap 131 from shoulder 137 to re-open valve 126. As such, fluid fuel component 22 is free to once again flow into reaction chamber 18. This cycle, which is similar to the cycle described in Table 1, repeats until fluid transfer valve 33, fuel transfer valve 34, or another downstream valve is closed by the operator or controller.

The pressure at which regulator/valve 126 opens or closes can be adjusted by adjusting the length of the valve stem or the gap that cap 131 travels between the open and closed position and/or by adjusting Pref. Stem 138 is sized and dimensioned to be movable relative to grommet 147 to adjust length of stem 138. The longer the length of stem 138 between grommet 147 and cap 131, the higher the pressure needed to close valve 126.

In the embodiment where pressure-regulating valve 126 is located downstream of reaction chamber 18, e.g., when valve 126 replaces valve 34 or when valve 126 is connected to the fuel cell or the device that houses the fuel cell, $P_{18}$ becomes the inlet pressure at channel 143 and the outlet pressure at channel 145 is the pressure of the hydrogen fuel gas that the fuel cell would receive. Preferably, the outlet pressure is substantially constant or is kept within an acceptable range, and the reference pressure, $P_{ref}$, is selected or adjusted to provide such an outlet pressure. In other words, $P_{ref}$ is set so that when the inlet pressure exceeds a predetermined amount, diaphragm 140 closes to minimize high or fluctuating outlet pressure at channel 145.

Figure 4C:
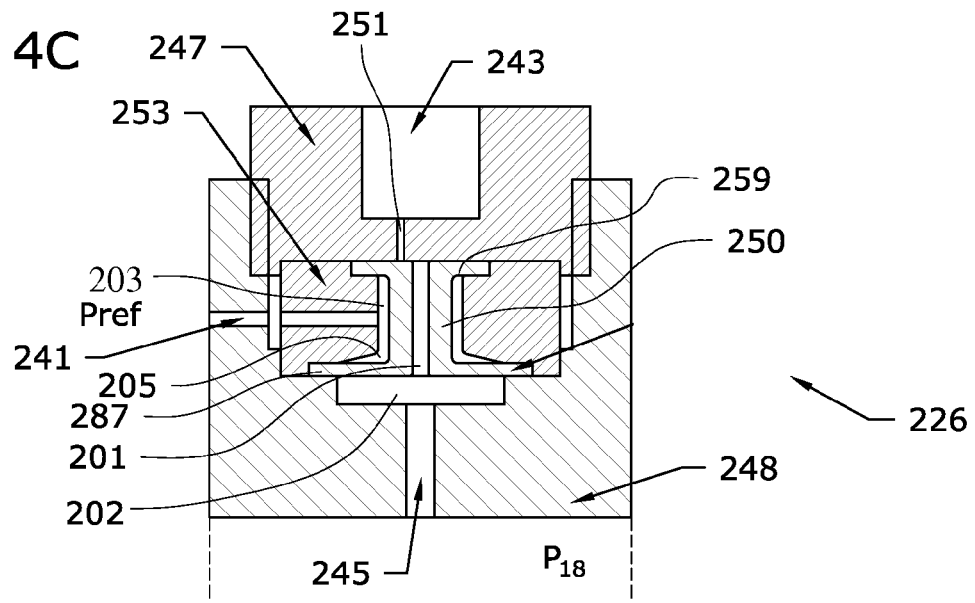
FIG. 4C is a cross-sectional view of an alternate pressure-regulating valve.
Figure 4D:
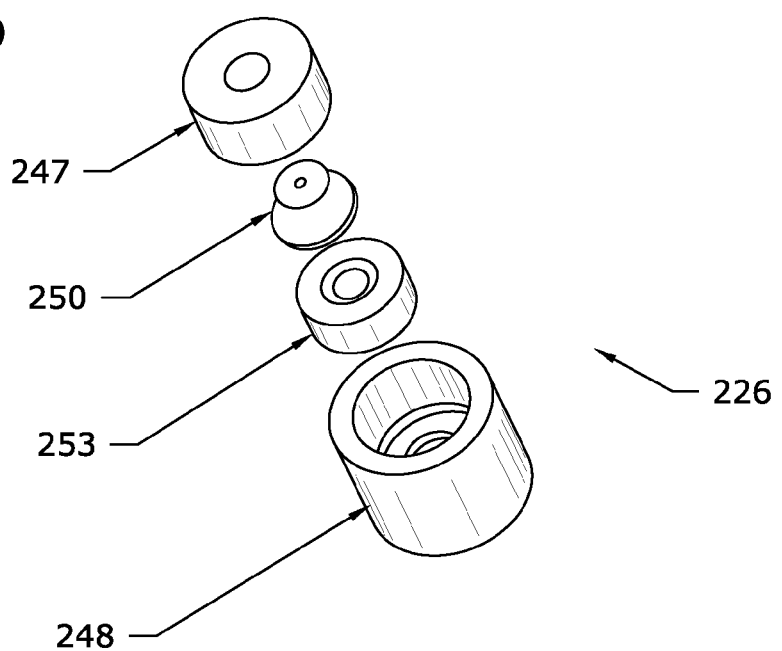
FIG. 4D is an exploded perspective view of the pressure-regulating valve of FIG. 4C.

Another embodiment of a pressure-regulating valve 226 is shown in FIGS. 4C and 4D. Pressure-regulating valve 226 is similar to pressure-regulating valve 126 discussed above, as a valve housing 248 is attached to a valve cap 247. Formed in valve cap 247 is an inlet 243, while a pressure regulated outlet 245 is formed in valve housing 248. A hole 251 is formed in a lower portion of valve cap 247. Preferably, hole 251 is slightly off-center from the longitudinal axis of pressure-regulating valve 226.

Sandwiched and retained between valve cap 247 and valve housing 248 is a deformable capped cylinder 250. Capped cylinder 250 includes an upper end 259, a lower end 287, and a hole or channel 201 formed therethrough. Capped cylinder 250 is made of any deformable, elastomeric material known in the art, such as rubber, urethane, or silicone. Capped cylinder 250 functions similar to a pressure-sensitive diaphragm.

Upper end 259 is positioned adjacent valve cap 247 such that when no fluid flows through pressure-regulating valve 226 upper end 259 is flush against a lower surface of valve cap 247. The edges of upper end 259 are fixed in position so that even if the remainder of upper cap 259 flexes, the edges remain stationary and sealed.

Lower end 287 is positioned adjacent valve housing 248. A void 202 is formed in valve housing 248 and is positioned directly below lower end 287 to allow lower end 287 to flex freely. Preferably, lower end 287 has a different diameter than upper end 259, as explained below.

A retainer 253 made of a substantially rigid material surrounds capped cylinder 250. Retainer 253 defines a hole 241 to connect a second void 203 formed circumferentially between capped cylinder 250 and retainer 253 with a reference pressure Pref. Portion 205 of second void 203 is configured to extend partially along and on top of lower cap 287.

To regulate pressure, inlet gas or liquid enters pressure-regulating valve through inlet 243 and passes into hole 251. Hole 251 can be a circular channel or ring defined on cap 247. Upper end 259 seals hole 251 until the pressure exerted by the inlet gas or liquid from inlet 243 reaches a threshold to deform upper end 259. When the gas deforms upper end 259, the deformation translates through the body of cylinder 250 to also deform lower end 287. Once upper end 259 deforms, the gas is able to pass through hole 251, through capped cylinder 250 and out regulated outlet 245.

Since the applied forces on capped cylinder 250 are the products of the applied pressure times the area exposed to that pressure, the forces acting on capped cylinder 250 can be summarized as follows:

Inlet Force+Reference Force ⟷ Outlet Force (P at inlet 243·Area of upper end 259)+(Pref·Area of portion 205) ⟷ (P at outlet 245·Area of lower end 287)

When the outlet force is greater than the inlet and reference forces, then pressure-regulating valve 226 is closed, and when outlet force is less than the inlet and reference forces, the valve 226 is open. Since, in this embodiment the outlet force has to counter-balance both the inlet and reference forces, the area of lower end 287 is advantageously made larger than the area of upper end 259, as shown, so that the outlet force may be larger without increasing the outlet pressure. By varying the areas of ends 259 and 287 and portion 205, the balance of forces on capped cylinder 250 can be controlled and the pressure differential required to open and close valve 226 can be determined.

Since reference pressure $P_{ref}$ tends to press down on lower end 287, this additional pressure can lower the threshold pressure to initiate flow, i.e., reference pressure $P_{ref}$ is relatively high to assist the gas in deforming capped cylinder 250. Reference pressure $P_{ref}$ may be adjusted higher or lower to further regulate the pressure of the gas leaving outlet 245.

Figure 5A:
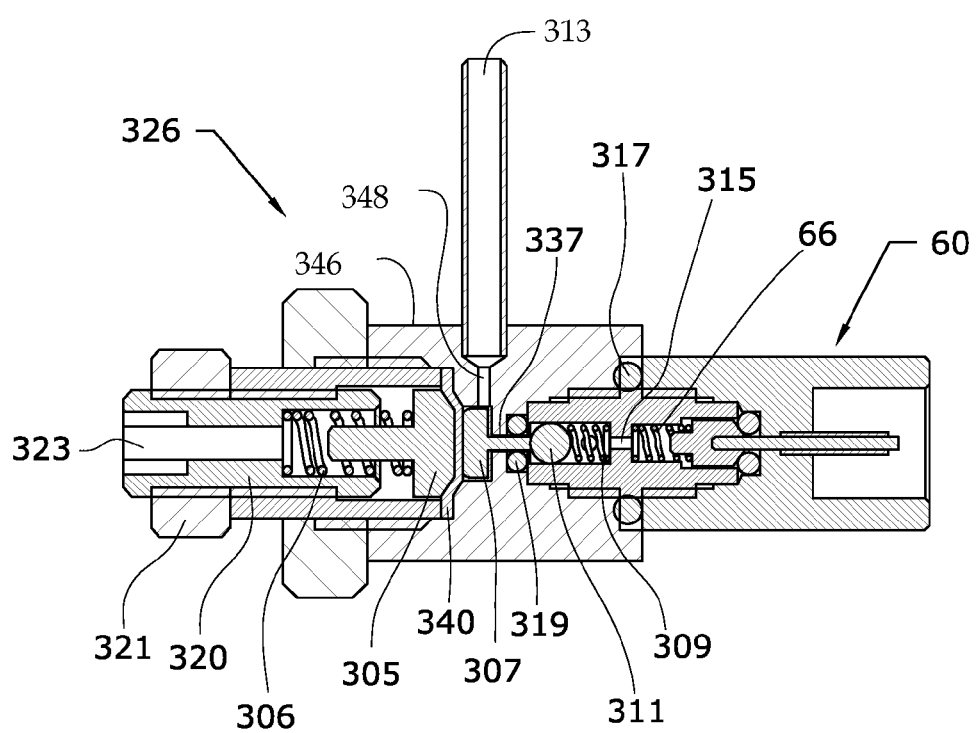
FIG. 5A is a cross-sectional view of another pressure-regulating valve connected to a first valve component of the shut-off valve of FIG. 2.

FIGS. 5A-D shows a combination of a pressure-regulating valve 326 being used with connection or shut-off valve 27. FIG. 5A shows pressure-regulating valve 326 being mated to be in fluid communication with valve component 60 of connection valve 27. Pressure-regulating valve 326 is similar to pressure-regulating valves 126 and 226 described above, and has a spring-biased diaphragm 340. Diaphragm 340 is supported by first piston 305, which is being biased by spring 306 toward second piston 307. First piston 305 is opposed by second piston 307 biased by spring 309, which biases piston 307 toward piston 305. A ball 311 is disposed between spring 309 and second piston 307.

Springs 306 and 309 oppose each other, and, by balancing the forces exerted by the two springs, the outlet pressure at channel 313 can be determined. Spring 309 does not act on or have any effect on spring 66 of valve component 60. When valve component 60 is opened by mating with valve component 62, shown in FIGS. 5B-5D, hydrogen fuel gas or other fluids flows through valve component 60 and to inlet 315. If the fluid is hydrogen gas, then the hydrogen is transported to the fuel cell. A flow path through valve 326 is established from inlet 315 through spring 309, around ball 311, through the space between piston 307 and shoulder 337 of housing 346, though orifice 337 of housing 346, and through orifice 348 and outlet 313. In this embodiment, the space between piston 307 and shoulder 337 is normally open to allow fluid to pass therethrough.

The pressure of the incoming fluid through inlet 315 or the pressure at outlet 313, if sufficiently high, may overcome the resultant force between springs 306 and 309 and move diaphragm 340 and pistons 305 and 307 to the left as depicted in FIG. 5A. Spring 309 then biases ball 311 to sealing member 319 to seal valve 326. To ensure that the flow of fuel follows the preferred path, sealing member 317 may be provided.

In one embodiment, the force applied on diaphragm 340 and pistons 305 and 307 can be adjusted. Spring 306 is adjustable by a rotational adjusting member 321, which is secured by a threaded lock nut 321. Rotating adjusting member 321 in one direction further compresses spring 306 to increase the force applied on the diaphragm and pistons, and rotating in the opposite direction expands spring 306 to decrease the force applied on the diaphragm and pistons. Additionally, a reference pressure, $P_{ref}$, can be applied to channel 323 behind piston 305 to apply another force on piston 305.

Figure 5B:
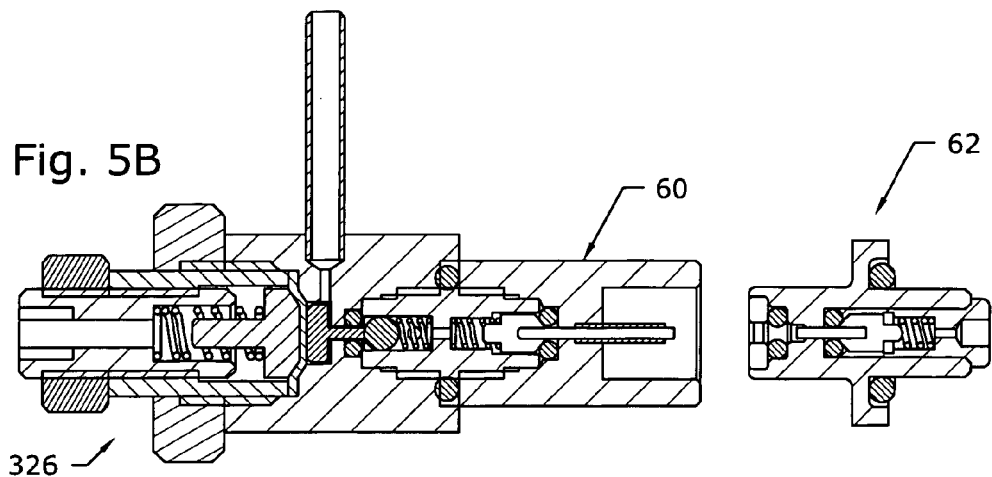
FIGS. 5B-D are cross-sectional views showing the pressure-regulating valve and the first valve component with a second valve component of the shut-off valve in the unconnected, connected/closed and connected/open positions.
Figure 5C:
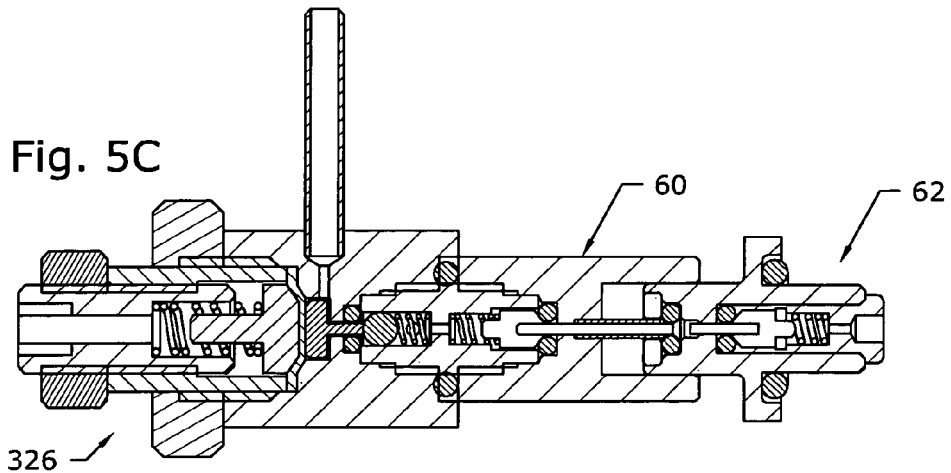
Figure 5D:
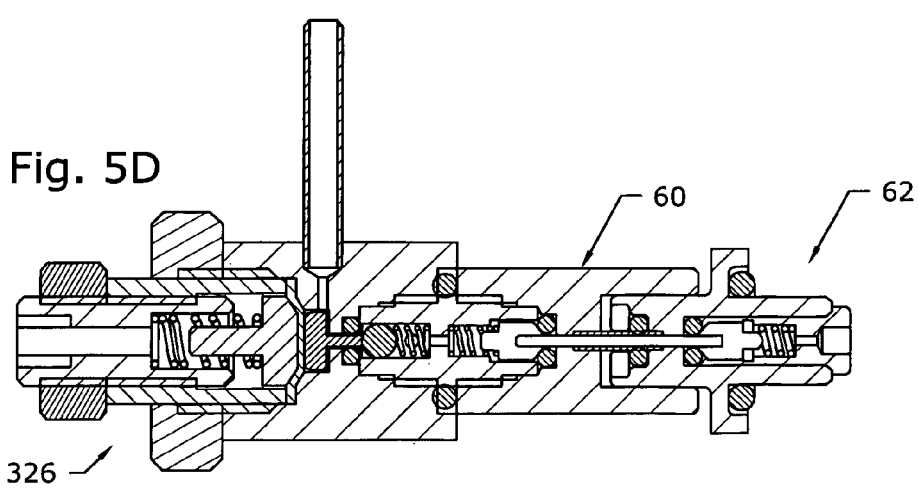

FIG. 5B shows pressure regulator/valve 326 connected to valve component 60 with valve component 62 not connected to valve component 60. FIG. 5C shows regulator/valve 326 with valve components 60 and 62 partially engaged, but with no flow path established through valve components 60 and 62. FIG. 5D shows regulator/valve 326 with valve components 60 and 62 fully engaged with a flow path established through valve components 60 and 62. In one embodiment, valve component 62 may be connected to conduit 16 of gas-generating apparatus 12, shown in FIG. 1, and regulator 326 replaces valve 34 and is connected to the fuel cell or the device. On the other hand, valve component 62 may be connected to the fuel cell or the device and regulator 326 and valve component 60 are connected to the gas-generating apparatus or fuel supply. If a high pressure surges through valve 326, diaphragm 340 limits the amount of fuel that can be transported through conduit 313.

Figure 6A:
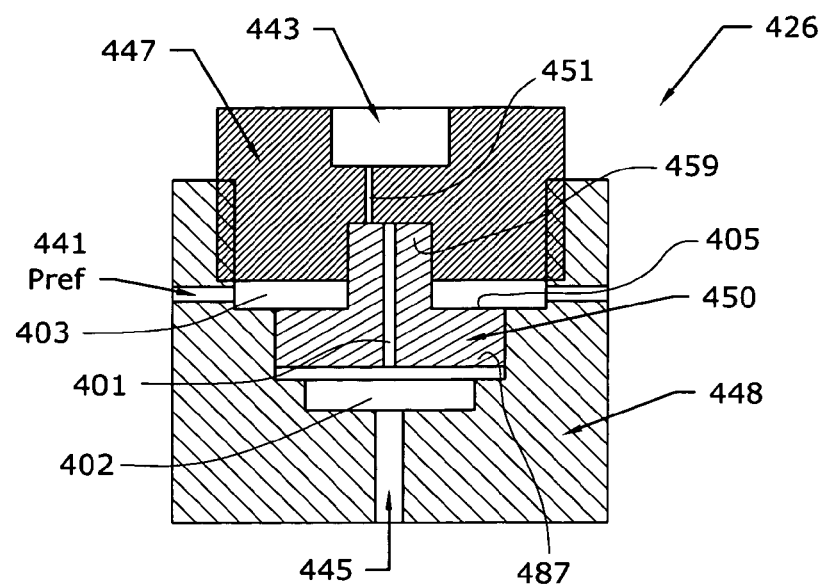
FIG. 6A is a cross-sectional view of a pressure-regulating valve for use in the gas-generating apparatus of FIG. 1.
Figure 6B:
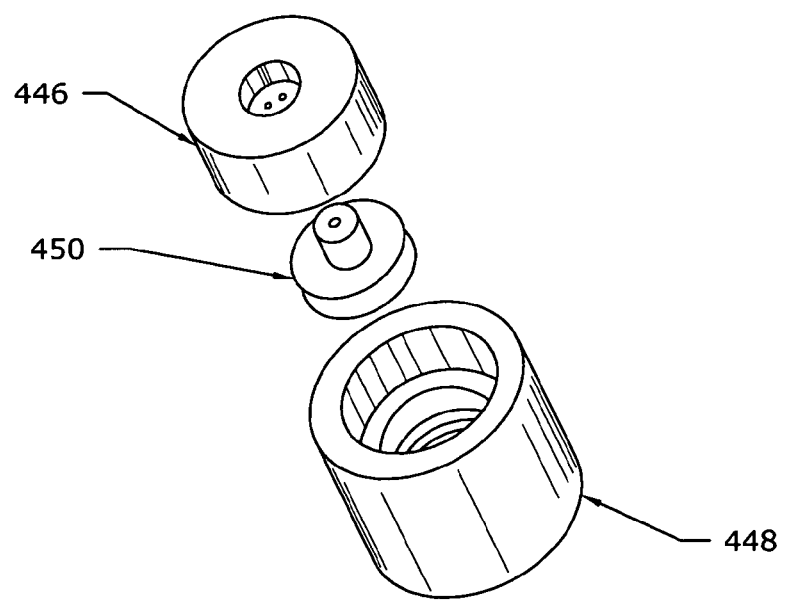
FIG. 6B is an exploded view of the pressure-regulating valve of FIG. 6A.

Another embodiment of a pressure-regulating valve 426 is shown in FIGS. 6A and B. Pressure-regulating valve 426 is similar to pressure-regulating valve 226, discussed above, except that valve 426 has a slidable piston 450 instead of flexible capped cylinder 250. Valve 426 has valve housing 448 attached to a valve cap 447. Formed in valve cap 447 is an inlet 443, while a pressure regulated outlet 445 is formed in valve housing 448. A hole 451 is formed in a lower portion of valve cap 447. Preferably, hole 451 is slightly off-center from the longitudinal axis of pressure-regulating valve 426. Hole 451 may comprise a plurality of holes formed as a ring so that the inlet pressure is applied uniformly on slidable piston 450.

Slidably disposed between valve cap 447 and valve housing 448 is a slidable piston 450. Slidable piston 450 includes an upper portion 459 having a first diameter, a lower portion 487 having a second diameter which is preferably larger than the diameter of upper portion 459, and a hole 401 formed therethrough. Slidable piston 450 is made of any rigid material known in the art, such as plastic, elastomer, aluminum, a combination of elastomer and a rigid material or the like.

A space 402 is formed in valve housing 448 to allow piston 450 to slide between cap 447 and housing 448. A second void 403 is formed between slidable piston 450 and valve housing 448. Void 403 is connected with a reference pressure Pref. A portion 405 of void 403 is positioned opposite to lower end 487, so that a reference force can be applied on piston 450.

Upper portion 459 is positioned adjacent valve cap 447 such that when the outlet force exceeds the inlet force and the reference force, as discussed above, upper portion 459 is flush against a lower surface of valve cap 447 to close valve 426, as shown in FIG. 6A. When the outlet force is less than the inlet and reference forces, piston 450 is pushed toward housing 448 to allow fluids, such as hydrogen gas, to flow from inlet 443 through hole(s) 451 and hole 401 to outlet 445. Again, as discussed above with reference to valve 226, the surface areas of ends 459 and 487, and of space 405 can be varied to control the opening and closing of valve 426.

As will be recognized by those in the art, any of these valves may be used, either alone or in combination, to provide pressure-based regulation of gas-generating apparatus 12. For example, valve 126, 226, 326 or 426 can be used in place of valve 26, 33 or 34.

In accordance to another aspect of the present invention, a pre-selected orifice is provided in conjunction with valve 126, 226, 326 and/or 426 to regulate the pressure or volume of the fluid, e.g., hydrogen gas, exiting from the outlet of these valves. For example, referring to valve 326, shown in FIG. 5A, orifice 348 is positioned upstream of outlet 313. In one aspect, orifice 326 acts as a flow restrictor to ensure that when the inlet pressure at inlet 315 or within pressure-regulating valve 326 is high, orifice 348 sufficiently limits the outlet flow at 313 so that the high pressure can act on diaphragm 340, moving it to the left, to close valve 326. An advantage of using flow restrictor/orifice 348 is when outlet 313 is open to a low pressure, e.g., atmospheric pressure, or open to a chamber that cannot hold pressure orifice 348 helps ensure that diaphragm 340 would sense the inlet pressure.

Orifice 348 may also control the flow of fluid out of outlet 313. When the range of inlet pressure at inlet 315 or pressure internal to pressure-regulating valve 326 is known and the desirable flow rate is also known, by applying flow equations for compressible fluid flow, such as Bernoulli's equations (or using incompressible fluid flow equations as a close approximation thereof) the diameter(s) of orifice 348 can be determined.

Additionally, the diameter of effective diameter of orifice 348 may vary according to inlet pressure at inlet 315 or internal pressure of valve 326. One such variable orifice is described in commonly owned, co-pending U.S. Publ. Appl. No. US 2005/0118468, which is incorporated herein by reference in its entirety. The '468 reference discloses valve (252) shown in FIGS. 6(a)-(d) and 7(a)-(k) and corresponding texts of that reference. The various embodiments of this valve (252) have reduced effective diameter when flow pressure is high and have increased effective diameter when the flow pressure is lower.

Figure 7A:
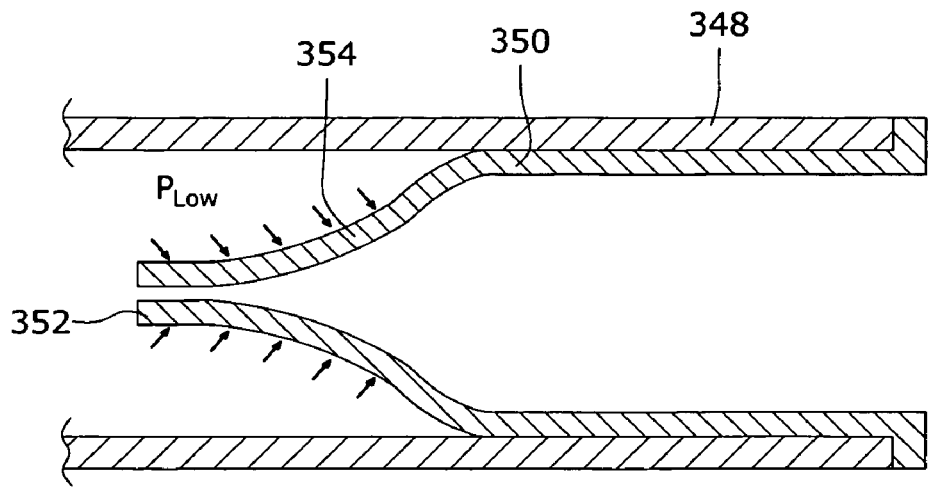
FIGS. 7A and 7B are cross-sectional views of a variable diameter orifice for use with the pressure-regulating valves of the present invention.
Figure 7B:
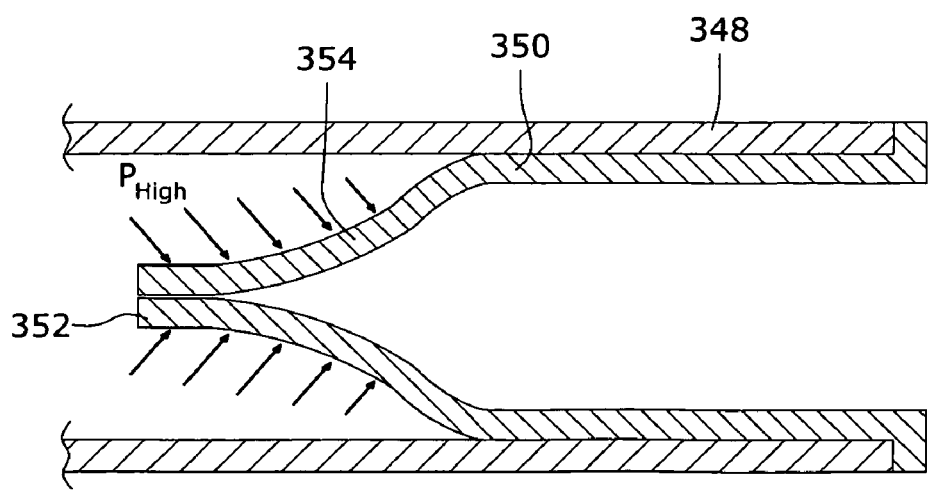

Another variable orifice 348 is shown in FIGS. 7A and 7B. In this embodiment, orifice 348 or another fluid conduit has a duckbill valve 350 disposed therein with nozzle 352 facing the direction of fluid flow, as shown. The fluid's pressure acts on neck 354 and when the pressure is relatively low the diameter of nozzle 352 is relatively large, and when the pressure is relatively high the diameter of nozzle 352 is relatively small to further restrict flow. When pressure is sufficiently high, nozzle 352 may be shut off.

Some examples of the fuels that are used in the present invention include, but are not limited to, hydrides of elements of Groups IA-IVA of the Periodic Table of the Elements and mixtures thereof, such as alkaline or alkali metal hydrides, or mixtures thereof. Other compounds, such as alkali metal-aluminum hydrides (alanates) and alkali metal borohydrides may also be employed. More specific examples of metal hydrides include, but are not limited to, lithium hydride, lithium aluminum hydride, lithium borohydride, sodium hydride, sodium borohydride, potassium hydride, potassium borohydride, magnesium hydride, calcium hydride, and salts and/or derivatives thereof. The preferred hydrides are sodium borohydride, magnesium borohydride, lithium borohydride, and potassium borohydride. Preferably, the hydrogen-bearing fuel comprises the solid form of $NaBH_4$, $Mg(BH_4)_2$, or methanol clathrate compound (MCC) which is a solid and includes methanol. In solid form, $NaBH_4$ does not hydrolyze in the absence of water and therefore improves shelf life of the cartridge. However, the aqueous form of hydrogen-bearing fuel, such as aqueous $NaBH_4$, can also be utilized in the present invention. When an aqueous form of $NaBH_4$ is utilized, the chamber containing the aqueous $NaBH_4$ also includes a stabilizer. Exemplary stabilizers can include, but are not limited to, metals and metal hydroxides, such as alkali metal hydroxides. Examples of such stabilizers are described in U.S. Pat. No. 6,683,025, which is incorporated by reference herein in its entirety. Preferably, the stabilizer is NaOH.

The solid form of the hydrogen-bearing fuel is preferred over the liquid form. In general, solid fuels are more advantageous than liquid fuels because the liquid fuels contain proportionally less energy than the solid fuels and the liquid fuels are less stable than the counterpart solid fuels. Accordingly, the most preferred fuel for the present invention is powdered or agglomerated powder sodium borohydride.

According to the present invention, the fluid fuel component preferably is capable of reacting with a hydrogen-bearing solid fuel component in the presence of an optional catalyst to generate hydrogen. Preferably, the fluid fuel component includes, but is not limited to, water, alcohols, and/or dilute acids. The most common source of fluid fuel component is water. As indicated above and in the formulation below, water may react with a hydrogen-bearing fuel, such as $NaBH_4$ in the presence of an optional catalyst to generate hydrogen.

$$X(BH_4)_y + 2H_2O \rightarrow X(BO)_2 + 4H_2$$

Where X includes, but is not limited to, Na, Mg, Li and all alkaline metals, and y is an integer.

Fluid fuel component also includes optional additives that reduce or increase the pH of the solution. The pH of fluid fuel component can be used to determine the speed at which hydrogen is produced. For example, additives that reduce the pH of fluid fuel component result in a higher rate of hydrogen generation. Such additives include, but are not limited to, acids, such as acetic acid and sulfuric acid. Conversely, additives that raise the pH can lower the reaction rate to the point where almost no hydrogen evolves. The solution of the present invention can have any pH value less than 7, such as a pH of from about 1 to about 6 and, preferably, from about 3 to about 5.

In some exemplary embodiments, fluid fuel component includes a catalyst that can initiate and/or facilitate the production of hydrogen gas by increasing the rate at which fluid fuel component reacts with a fuel component. The catalyst of these exemplary embodiments includes any shape or size that is capable of promoting the desired reaction. For example, the catalyst may be small enough to form a powder or it may be as large as the reaction chamber, depending on the desired surface area of the catalyst. In some exemplary embodiments, the catalyst is a catalyst bed. The catalyst may be located inside the reaction chamber or proximate to the reaction chamber, as long as at least one of either fluid fuel component or the solid fuel component comes into contact with the catalyst.

The catalyst of the present invention may include one or more transitional metals from Group VIIIB of the Periodic Table of Elements. For example, the catalyst may include transitional metals such as iron (Fe), cobalt (Co), nickel (Ni), ruthenium (Ru), rhodium (Rh), platinum (Pt), palladium (Pd), osmium (Os) and iridium (Ir). Additionally, transitional metals in Group IB, i.e., copper (Cu), silver (Ag) and gold (Au), and in Group IIB, i.e., zinc (Zn), cadmium (Cd) and mercury (Hg), may also be used in the catalyst of the present invention. The catalyst may also include other transitional metals including, but not limited to, scandium (Sc), titanium (Ti), vanadium (V), chromium (Cr) and manganese (Mn). Transition metal catalysts useful in the present invention are described in U.S. Pat. No. 5,804,329, which is incorporated by reference herein in its entirety. The preferred catalyst of the present invention is $CoCl_2$.

Some of the catalysts of the present invention can generically be defined by the following formula:

$$M_a X_b$$

wherein M is the cation of the transition metal, X is the anion, and "a" and "b" are integers from 1 to 6 as needed to balance the charges of the transition metal complex.

Suitable cations of the transitional metals include, but are not limited to, iron (II) ($Fe^{2+}$), iron (III) ($Fe^{3+}$), cobalt ($Co^{2+}$), nickel (II) ($Ni^{2+}$), nickel (III) ($Ni^{3+}$), ruthenium (III) ($Ru^{3+}$), ruthenium (IV) ($Ru^{4+}$), ruthenium (V) ($Ru^{5+}$), ruthenium (VI) ($Ru^{6+}$), ruthenium (VIII) ($Ru^{8+}$), rhodium (III) ($Rh^{3+}$), rhodium (IV) ($Rh^{4+}$), rhodium (VI) ($Rh^{6+}$), palladium ($Pd^{2+}$), osmium (III) ($Os^{3+}$), osmium (IV) ($Os^{4+}$), osmium (V) ($Os^{5+}$), osmium (VI) ($Os^{6+}$), osmium (VIII) ($OS^{8+}$), iridium (III) ($Ir^{3+}$), iridium (IV) ($Ir^{4+}$), iridium (VI) ($Ir^{6+}$), platinum (II) ($Pt^{2+}$), platinum (III) ($Pt^{3+}$), platinum (IV) ($Pt^{4+}$), platinum (VI) ($Pt^{6+}$), copper (I) ($Cu^+$), copper (II) ($Cu^{2+}$), silver (I) ($Ag^+$), silver (II) ($Ag^{2+}$), gold (I) ($Au^+$), gold (III) ($Au^{3+}$), zinc ($Zn^{2+}$), cadmium ($Cd^{2+}$), mercury (I) ($Hg^+$), mercury (II) ($Hg^{2+}$), and the like.

Suitable anions include, but are not limited to, hydride ($H^-$), fluoride ($F^-$), chloride ($Cl^-$), bromide ($Br^-$), iodide ($I^-$), oxide ($O^{2-}$), sulfide ($S^{2-}$), nitride ($N^{3-}$), phosphide ($P^{4-}$), hypochlorite ($ClO^-$), chlorite ($ClO_2^-$), chlorate ($ClO_3^-$), perchlorate ($ClO_4^-$), sulfite ($SO_3^{2-}$), sulfate ($SO_4^{2-}$), hydrogen sulfate ($HSO_4^-$), hydroxide ($OH^-$), cyanide ($CN^-$), thiocyanate ($SCN^-$), cyanate ($OCN^-$), peroxide ($O_2^{2-}$), manganate ($MnO_4^{2-}$), permanganate ($MnO_4^-$), dichromate ($Cr_2O_7^{2-}$), carbonate ($CO_3^{2-}$), hydrogen carbonate ($HCO_3^-$), phosphate ($PO_4^{2-}$), hydrogen phosphate ($HPO_4^-$), dihydrogen phosphate ($H_2PO_4^-$), aluminate ($Al_2O_4^{2-}$), arsenate ($AsO_4^{3-}$), nitrate ($NO_3^-$), acetate ($CH_3COO^-$), oxalate ($C_2O_4^{2-}$), and the like. A preferred catalyst is cobalt chloride.

In some exemplary embodiments, the optional additive, which is in fluid fuel component and/or in the reaction chamber, is any composition that is capable of substantially preventing the freezing of or reducing the freezing point of fluid fuel component and/or solid fuel component. In some exemplary embodiments, the additive can be an alcohol-based composition, such as an anti-freezing agent. Preferably, the additive of the present invention is $CH_3OH$. However, as stated above, any additive capable of reducing the freezing point of fluid fuel component and/or solid fuel component may be used.

Other embodiments of the present invention will be apparent to those skilled in the art from consideration of the present specification and practice of the present invention disclosed herein. For example, any of the valves herein may be triggered by an electronic controller such as a microprocessor. A component of one valve can be used with another valve. Also, a pump may be included to pump the fluid fuel component into the reaction chamber. It is intended that the present specification and examples be considered as exemplary only with a true scope and spirit of the invention being indicated by the following claims and equivalents thereof.

We claim:

1. A gas-generating apparatus comprising:
   a gas-impermeable housing;
   a fuel container having at least one gas-permeable wall surrounding a first fuel component, wherein the fuel container is located at least partially within the gas-impermeable housing;
   a reservoir containing a liquid fuel component; and
   a fluid path for introducing the liquid fuel component to the first fuel component within the fuel container to react to produce a gas,
   wherein the at least one gas-permeable wall of the fuel container comprises a fibrous absorbent layer disposed between an inner layer and an outer layer, wherein at least one of the inner layer and outer layer comprises a liquid-impermeable layer material having at least one opening formed therethrough, a third liquid-impermeable layer having at least one opening disposed outside of said outer layer wherein the at least one opening in the third layer is located away from the at least one opening in the outer layer.

2. A gas-generating apparatus comprising:

a gas-impermeable housing;

a fuel container having at least one gas-permeable wall and containing a first fuel component, wherein the fuel container is located at least partially within the gas-impenneable housing;

a reservoir containing a liquid fuel component; and a fluid path for introducing the liquid fuel component into the interior of the first fuel component within the fuel container to react to produce a gas, wherein the fuel container comprises at least one fluid dispersal tube, so that the liquid fuel component is introduced at at least one discrete point, and wherein said dispersal tube comprises an annular space between said dispersal tube and an inner rod to conduct flow therethrough and wherein the dispersal tube and inner rod are permanently fixed relative to each other.

3. The gas-generating apparatus of claim 1, wherein the fluid path comprises a valve that opens and closes relative to the pressures of the housing and the reservoir.

4. The gas-generating apparatus of claim 2 further comprising a pressure-regulating valve operatively associated with the fluid path.

5. The gas-generating apparatus of claim 4, wherein the pressure-regulating valve comprises a pressure-responsive diaphragm.

6. The gas-generating apparatus of claim 5, wherein the diaphragm is biased by an energy storage element.

7. The gas-generating apparatus of claim 6, wherein the energy storage element comprises a spring.

8. The gas-generating apparatus of claim 6, wherein the energy storage element comprises a reference pressure.

9. The gas-generating apparatus of claim 5, wherein the diaphragm is in communication with the fuel container.

10. The gas-generating apparatus of claim 5, wherein the diaphragm is connected to a sealing member.

11. The gas-generating apparatus of claim 10, wherein the sealing member is adjustable to vary the pressure that seals the pressure-regulating valve.

12. The gas-generating apparatus of claim 2 further comprising:

a first pressure-sensitive valve for controlling a flow of the liquid fuel component to the second fuel component; and a second pressure-sensitive valve for controlling a flow of the gas out of the gas-generating apparatus.

13. The gas-generating apparatus of claim 12, wherein when a pressure of the gas is greater than a first predetermined amount, the first pressure-sensitive valve closes the fluid path.

14. The gas-generating apparatus of claim 13, wherein when the pressure of the gas is less than a second predetermined amount, the second pressure-sensitive valve closes the flow of gas out of the gas-generating apparatus.

15. The gas-generating apparatus of claim 14, wherein when the pressure of the gas is greater than the second predetermined amount, the second pressure-sensitive valve opens the flow of gas out of the gas-generating apparatus.

16. The gas-generating apparatus of claim 14, wherein when the pressure of the gas is less than the first predetermined amount, the first pressure-sensitive valve opens the fluid path.

17. The gas-generating apparatus of claim 12, wherein when the liquid fuel component is pressurized.

18. The gas-generating apparatus of claim 12, wherein the first pressure-sensitive valve comprises a check valve, a duckbill valve, or a diaphragm valve.

19. The gas-generating apparatus of claim 12, wherein the first pressure-sensitive valve comprises a pressure sensitive diaphragm.

20. The gas-generating apparatus of claim 19, wherein the diaphragm is supported by an energy-storage device.

21. The gas-generating apparatus of claim 19, wherein the first pressure-sensitive valve comprises a globe seal.

22. The gas-generating apparatus of claim 21, wherein the first pressure-sensitive valve further comprises a check valve, a duckbill valve, or a diaphragm valve.

23. The gas-generating apparatus of claim 12, wherein the second pressure-sensitive valve comprises a check valve, a duckbill valve or a pressure regulating valve.

24. The gas-generating apparatus of claim 12, wherein the liquid fuel component comprises water.

25. The gas-generating apparatus of claim 12, wherein said another fuel component comprises a hydride.

26. The gas-generating apparatus of claim 1 further comprising:

a pressure cycling system, wherein the pressure cycling system regulates a flow of the liquid fuel component to said another fuel component based on at least a pressure of the gas in said another fuel component, and wherein the pressure cycling system regulates a flow of the gas out of the gas-generating apparatus based on at least the pressure of the gas.

27. The gas-generating apparatus of claim 26, wherein the pressure cycling system comprises a first valve and a second valve, wherein the first valve regulates a flow of the liquid fuel component to the second fuel component and wherein the second valve regulates a flow of the gas out of the gas-generating apparatus.

28. The gas-generating apparatus of claim 27, wherein the first valve and the second valve are pressure-sensitive valves.

29. The gas-generating apparatus of claim 26, wherein said another fuel component is a hydride.

30. The gas-generating apparatus of claim 26, wherein the liquid fuel component comprises water.

31. The gas-generating apparatus of claim 26, wherein the liquid fuel component is pressurized.

32. The gas-generating apparatus of claim 26, wherein the fluid path introduces the liquid fuel component into the inside of said another fuel component.

33. The gas-generating apparatus of claim 1, wherein another absorbent layer is disposed between the intermediate layer and the third layer.

34. The gas-generating apparatus of claim 2, wherein said dispersal tube comprises a plurality of discrete points.

* * * * *